US008962762B2

(12) United States Patent  
Ravishankar et al.

(10) Patent No.: US 8,962,762 B2
(45) Date of Patent: Feb. 24, 2015

(54) THERMOPLASTIC POLYMER COMPOSITIONS, METHODS FOR MAKING THE SAME, AND ARTICLES MADE THEREFROM

(75) Inventors: Periagaram S. Ravishankar, Kingwood, TX (US); Maria D. Ellul, Silver Lake Village, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 653 days.

(21) Appl. No.: 12/598,549

(22) PCT Filed: Apr. 14, 2008

(86) PCT No.: PCT/US2008/060234
§ 371 (c)(1),
(2), (4) Date: Feb. 10, 2010

(87) PCT Pub. No.: WO2008/154068
PCT Pub. Date: Dec. 18, 2008

(65) Prior Publication Data
US 2010/0137521 A1 Jun. 3, 2010

Related U.S. Application Data

(60) Provisional application No. 60/934,422, filed on Jun. 13, 2007.

(51) Int. Cl.
*C08L 23/14* (2006.01)
*C08L 23/10* (2006.01)
*C08F 210/06* (2006.01)
*C08L 23/12* (2006.01)
*C08L 23/16* (2006.01)

(52) U.S. Cl.
CPC ............... *C08L 23/10* (2013.01); *C08L 23/142* (2013.01); *C08F 210/06* (2013.01); *C08L 23/12* (2013.01); *C08L 23/16* (2013.01); *C08L 2205/02* (2013.01)
USPC ........................................ 525/240; 525/191

(58) Field of Classification Search
USPC .................................................. 525/191, 240
See application file for complete search history.

(56) References Cited

U.S. PATENT DOCUMENTS

| | | | |
|---|---|---|---|
| 4,016,342 A | 4/1977 | Wagensommer | |
| 4,130,535 A * | 12/1978 | Coran et al. | 524/487 |
| 4,306,041 A | 12/1981 | Cozewith et al. | |
| 4,311,628 A | 1/1982 | Abdou-Sabet et al. | |
| 4,530,914 A | 7/1985 | Ewen et al. | |
| 4,540,753 A | 9/1985 | Cozewith et al. | |
| 5,057,475 A | 10/1991 | Canich et al. | |
| 5,100,947 A | 3/1992 | Puydak et al. | |
| 5,157,081 A | 10/1992 | Puydak et al. | |
| 5,391,790 A | 2/1995 | Rohrmann et al. | |
| 5,986,008 A | 11/1999 | Matsunaga et al. | |
| 6,319,998 B1 | 11/2001 | Cozewith et al. | |
| 6,635,715 B1 | 10/2003 | Datta et al. | |
| 6,642,316 B1 | 11/2003 | Datta et al. | |
| 6,730,742 B1 | 5/2004 | Demain | |
| 6,750,284 B1 | 6/2004 | Dharmarajan et al. | |
| 6,867,260 B2 | 3/2005 | Datta et al. | |
| 6,927,258 B2 | 8/2005 | Datta et al. | |
| 7,094,835 B2 | 8/2006 | Datta et al. | |
| 7,132,478 B2 | 11/2006 | Datta et al. | |
| 7,202,305 B2 * | 4/2007 | Datta et al. | 525/240 |
| 2004/0260021 A1 | 12/2004 | Macedo et al. | |
| 2004/0266947 A1 | 12/2004 | Macedo et al. | |
| 2005/0165173 A1 | 7/2005 | Autran et al. | |
| 2005/0187349 A1 | 8/2005 | Kim et al. | |
| 2006/0084762 A1 | 4/2006 | Shaw | |
| 2006/0100384 A1 * | 5/2006 | Datta et al. | 525/240 |

FOREIGN PATENT DOCUMENTS

WO      WO 00/70134      11/2000

OTHER PUBLICATIONS

Uan-Zo-li, Julie Tammy "Morphology, Crystallization, and Melting Behavior of Propylene-Ethylene Statistical Copolymers." Dlss. Virginia Polytechnic Institute and State University, Sep. 2005 pp. 27-29.*

Kakugo et al., "$^{13}$C NMR Determination of Monomer Sequence Distribution in Ethylene-Propylene Copolymers Prepared with $\delta$-$TiCl_3$-$Al(C_2H_5)_2Cl$", Macromolecules, 1982, vol. 15, No. 6, pp. 1150-1152.

Ver Strate et al., "Near Monodisperse Ethylene-Propylene Copolymers by Direct Ziegler-Natta Polymerization. Preparation, Characterization, Properties", Macromolecules, 1988, vol. 21, No. 12, pp. 3360-3371.

Ellul et al., "Crosslink Densities and Phase Morphologies in Dynamically Vulcanized TPEs", Rubber Chemistry and Technology, 1995, vol. 68, pp. 573-584.

* cited by examiner

*Primary Examiner* — Irina S Zemel
*Assistant Examiner* — Jeffrey Lenihan

(57) ABSTRACT

Provided are thermoplastic polymer compositions having a single melting point, articles made therefrom, and methods for elevating the melting point of low melting point polymers. Thermoplastic polymer compositions are composed of one or more high melting point polyolefins and a thermoplastic component that includes a low melting point polypropylene. High melting point polyolefins are composed of a stereoregular polypropylene having a tacticity similar to the low melting point polypropylene. The low melting point polypropylene includes, for example, propylene homopolymers and copolymers composed of propylene and one or more comonomers. Thermoplastic polymer compositions may also optionally contain any of the various additives commonly used in such polymer compositions, such as for example oils, etc. In one embodiment, thermoplastic polymer compositions are thermoplastic elastomer compositions that include an elastomeric component composed of an elastomer or rubber. The elastomeric component may be substantially or partially crosslinked to form a thermoplastic vulcanizate.

15 Claims, 5 Drawing Sheets

THERMOPLASTIC POLYMER COMPOSITIONS, METHODS FOR MAKING THE SAME, AND ARTICLES MADE THEREFROM

CROSS REFERENCE TO RELATED APPLICATIONS

This application is a 371 National Stage Application of International Application No. PCT/US2008/060234, filed Apr. 14, 2008, which claims the benefit of Provisional Application No. 60/934,422, filed Jun. 13, 2007, the disclosures of which are herein incorporated by reference in their entireties.

FIELD OF THE INVENTION

This invention relates to thermoplastic polymer compositions, articles made therefrom, and methods for making the same, and more particularly to thermoplastic polymer compositions having a single melting point.

BACKGROUND OF THE INVENTION

Conventional thermoplastic polymer compositions have a near limitless number of uses. As a result of having both durability and processability, thermoplastic polymers are used pervasively in various fields such as, for example, the automobile industry, manufacturing of industrial and domestic appliances, and hand-held utensils and tools.

Thermoplastic elastomer compositions are one type of thermoplastic polymer composition having a combination of both thermoplastic and elastic properties. These properties are generally obtained by combining a thermoplastic polymer with a rubber composition in a way such that the rubber is dispersed within a continuous phase of the thermoplastic polymer. Unlike conventional vulcanized rubbers, thermoplastic elastomer compositions can be processed and recycled like thermoplastic materials. Conventional thermoplastic elastomer compositions include, for example, polybutadiene or polyisoprene dispersed in a matrix of thermoplastic polymer such as polypropylene.

Thermoplastic polymer compositions, including polypropylene-based thermoplastic elastomer compositions, often suffer from long cycle times in thermoforming applications. The cycle time of a particular manufacturing process is a function of many factors, including factors derived solely from intrinsic properties of thermoplastic polymer compositions, such as for example melting temperature and crystallization temperature. Thermoplastic polymers having low crystallization rates and/or low crystallization temperatures require more time to cool and solidify so that a thermoformed article can be ejected from a die without losing shape. Long cycle times lead to inefficiencies in thermoforming processes, increased costs, and decreased productivity.

To shorten cycle time limitations, it is known to alter the crystallization kinetics of conventional thermoplastic materials, particularly propylene-based thermoplastic materials, by utilizing nucleating agents. In thermoforming processes, nucleating agents reduce cycle times by hastening crystallization. Unfortunately, nucleation agents are known to provide little or no effect on certain thermoplastic polymer compositions, such as for example thermoplastic elastomer compositions, especially when preparing commercial quantities. Nucleating agents may also interfere with curing elastomeric components. Lastly, utilizing nucleating agents often results in unwanted weight gain in thermoplastic elastomer compositions. Thus, industries that prepare thermoplastic elastomer compositions may abstain from using nucleating agents to reduce thermoforming cycle time. These same industries are searching for compositions that may be processed using shorter cycle times and exhibit a high service temperature while maintaining favorable elastomeric properties.

Accordingly there exists a current and long felt need for thermoplastic polymers that overcome known deficiencies in conventional compositions, have advantageous processing and thermoforming processing characteristics, and are generally suitable for thermoplastic elastomer (TPE) and thermoplastic vulcanizate (TPV) applications.

SUMMARY OF THE INVENTION

Provided are thermoplastic polymer compositions having a single melting point, articles made therefrom, methods for making the same, and methods for elevating the melting point of a low melting point polymer. Thermoplastic polymer compositions are composed of one or more high melting point polyolefins and a thermoplastic component that includes a low melting point polypropylene. High melting point polyolefins are composed of stereoregular polypropylene having a tacticity similar to the low melting point polypropylene. The low melting point polypropylene includes, for example, propylene homopolymers and copolymers composed of propylene and one or more comonomers. Comonomers include ethylene and at least one $C_4$ to $C_{20}$ α-olefin. Thermoplastic polymer compositions may also optionally contain any of the various additives commonly used in such polymer compositions, such as for example oils, etc.

Thermoplastic polymer compositions exhibit a single melting point without substantial loss of favorable physical characteristics, such as for example elasticity. Indeed, the single melting point of thermoplastic polymer compositions approaches the melting point of the high melting point polyolefin. Accordingly, thermoplastic polymer compositions require shorter cycle times for processing compared to similar compositions having lower melting and crystallization temperatures. Thus, thermoplastic polymer compositions are ideal for use in applications requiring high service temperatures. Articles are made from a variety of thermoforming techniques including, for example, injection molding and blow molding techniques.

In one embodiment, thermoplastic polymer compositions are thermoplastic elastomer compositions that include an elastomeric component composed of an elastomer or rubber. Exemplary elastomers include, for example, ethylene propylene diene monomer rubber. The elastomeric component may be substantially or partially crosslinked to form a thermoplastic vulcanizate.

Methods of elevating the melting point of a low melting point polypropylene include the steps of providing a thermoplastic component composed of the low melting point polypropylene, providing a high melting point polyolefin, and combining the thermoplastic component and high melting point polyolefin to form thermoplastic polymer compositions having a single melting point. In one embodiment, preparation of the thermoplastic component includes the steps of polymerizing the polypropylene in solution.

DETAILED DESCRIPTION OF ILLUSTRATIVE EMBODIMENTS

Figure 1:
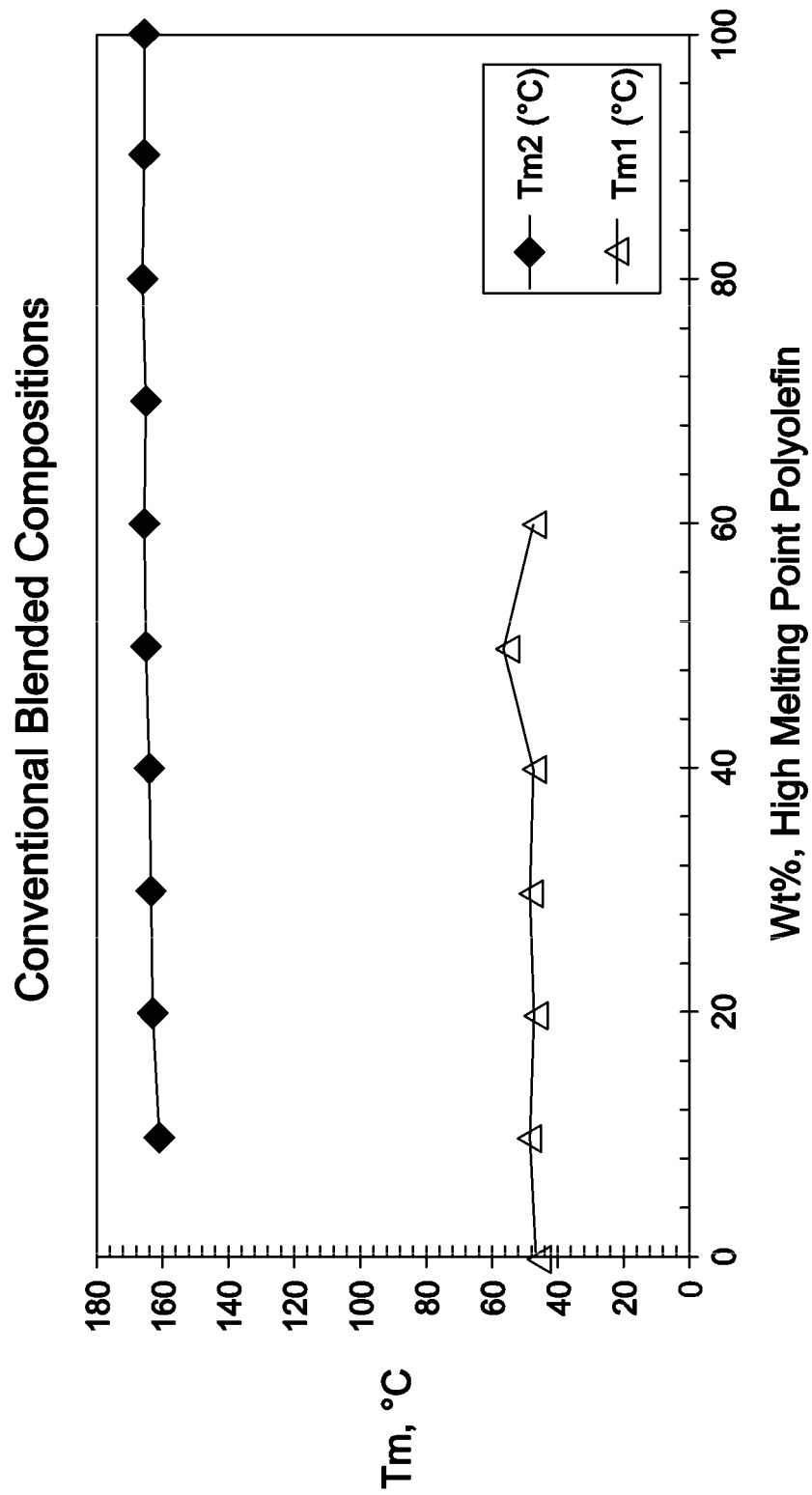
FIG. 1 is an X-Y graph of melting temperature versus weight percent high melting point polyolefin that illustrates the melting temperatures of conventional propylene copolymer compositions.

Provided are thermoplastic polymer compositions having a single melting point, articles made therefrom, methods for making the same, and methods for elevating the melting point of a low melting point polymer. Thermoplastic polymer compositions are composed of a thermoplastic component and one or more high melting point polyolefins. Thermoplastic polymer compositions exhibit a single melting point without substantial loss of favorable characteristics, such as for example elasticity. Thus, thermoplastic polymer compositions are ideal for use in applications requiring high service temperatures and in processes where shorter cycle times are preferred, such as for example injection molding and blow molding techniques.

The thermoplastic component is composed of one or more thermoplastic polymers, including for example a low melting point polypropylene. "Polypropylene", "polypropylene polymer(s)", or "propylene polymer(s)" mean homopolymers, copolymers, terpolymers, higher order copolymers, or interpolymers made from propylene derived units, or combinations thereof.

As used herein "homopolymer" means polymers resulting from the polymerization of a single monomer, i.e., a polymer consisting essentially of a single type of repeating unit.

As used herein, the term "copolymer(s)" refers to polymers formed by the polymerization of at least two different monomers. For example, the term "copolymer" includes the copolymerization reaction product of ethylene and an α-olefin, such as for example, 1-hexene.

"Low melting point polypropylene" as used herein means polypropylene having a melting temperature ("$T_m$") of not more than about 150° C. Preferably, low melting point polypropylene has a melting temperature of not more than about 140° C., or not more than about 130° C. In some embodiments low melting point polypropylene has a melting temperature of not more than about 90° C., or not more than about 80° C.

As used herein, all temperatures are determined by differential scanning calorimetry ("DSC"), unless expressly stated otherwise. Low melting point polypropylenes may show secondary melting peaks adjacent to a principal peak, however, as used herein the greatest peak identifies melting temperature.

An exemplary method of identifying a composition's melting temperature is determined by conventional DSC techniques. For example, first a sample is pressed at elevated temperature and removed with a punch die. The sample is then annealed at room temperature. After annealing, the sample is placed in a differential scanning calorimeter, e.g., DSC 2920 with autosampling from TA Instruments or Perkin Elmer 7 Series Thermal Analysis System, and cooled. Then the sample is heated to a final temperature and the thermal output is recorded as the area under the melting peak curve of the sample. The thermal output in joules is a measure of the heat of fusion. The melting temperature ($T_m$) is recorded as the temperature of the greatest heat absorption within the range of melting of the sample. This is called the first melt. The sample is then cooled. The peak crystallization temperature and associated heat of crystallization are monitored. The sample is reheating to form a second melt, which is more reproducible than the first melt. The peak melting temperature from the second melt is recorded as the second $T_m$.

For example, melting temperature may be determined by pressing a 6 to 10 mg sample of a sheet of the polypropylene polymer at approximately 200° C. to 230° C. The sample is then annealed at room temperature for 80 to 100 hours. At the end of the annealing period, the sample is placed in a differential scanning calorimeter and cooled to −50° C. to −70° C. The sample is then heated at a rate of 20° C./min to a final temperature of 200° C. to 220° C. The thermal output may peak at about 30° C. to about 185° C. The sample is then cooled at a rate of 10° C./min to 25° C. The non-isothermal crystallization temperature ("$T_c$") may be between 100° C. and 125° C. Likewise the second melting and cooling temperatures may be obtained.

Low melting point polypropylenes include each low melting point polypropylenes known to those skilled in the art. Low melting point polypropylene can vary widely in composition. Examples of low melting point polypropylene include stereoregular polypropylene, stereoregular polypropylene segments separated by amorphous polypropylene, amorphous polypropylene, polypropylene copolymers, polypropylene terpolymers, and higher order polypropylene copolymers. As used herein "stereoregular polypropylene" means stereoregular propylene sequences long enough to crystallize under conditions known to those skilled in the art.

Preferably, low melting point polypropylene is a propylene-based copolymer, i.e., propylene copolymer, which may also be referred to as a propylene-α-olefin copolymer. Propylene copolymer includes one or more units, i.e., mer units, derived from propylene, one or more comonomer units derived from ethylene or α-olefins including from 4 to about 20 carbon atoms. Optionally one or more comonomer units derive from dienes.

In one or more embodiments, the α-olefin comonomer units derive from ethylene, 1-butene, 1-hexane, 4-methyl-1-pentene and/or 1-octene. Exemplary alpha-olefins are selected from the group consisting of ethylene, butene-1, pentene-1,2-methylpentene-1,3-methylbutene-1, hexene-1, 3-methylpentene-1,4-methylpentene-1,3,3-dimethylbutene-1, heptene-1, hexene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1, and hexadodecene-1.

Exemplary diene comonomer units include 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, and dicyclopentadiene.

Exemplary propylene copolymers are described in U.S. Pat. Nos. 7,132,478, 7,094,835, 6,927,258, 6,867,260, and 6,642,316, each of which is herein incorporated by reference in its entirety Propylene polymers include no more than about 25 weight percent of α-olefin comonomers, based on the weight of the propylene copolymer. Preferably, propylene copolymers include no more than about 20 weight percent, or no more than about 15 weight percent of α-olefin comonomers. More preferably, propylene copolymers include no more than about 12, or no more than about 10 weight percent of α-olefin comonomers. Still more preferably, propylene copolymers include no more than about 9, or no more than about 7 weight percent of α-olefin comonomers. In one or more embodiments propylene copolymers include from about 3.0 to about to about 7.0 weight percent of α-olefin comonomers. In other embodiments, propylene copolymers include from about 4 to about 6 weight percent of α-olefin comonomers. In still other embodiments, propylene copolymers include no more than about 5 weight percent or from about 3 to about 5 weight percent of α-olefin comonomers.

In one or more embodiments, propylene copolymers are terpolymers or higher order copolymers, e.g., tetramers. While still maintaining a single melting point, terpolymers and higher order propylene copolymers may include a broader weight percentage range of comonomers compared to copolymers prepared with only two types of monomer. Without being limited by theory, it is believed that high comonomer concentrations are achieved without creating crystalline defects that thereby act as, or create, phase boundaries.

Without being limited by theory, it is believed that increasing comonomer concentration imparts thermoplastic polymer compositions with improved physical properties, e.g., elasticity. Moreover, without being limited by theory, it is believed that thermoplastic polymer compositions prepared with higher order α-olefins, e.g. 1-octene, or $C_{15}$, exhibit improved processing properties and improved physical properties, such as elasticity, compared to the properties of copolymers having lower order α-olefins, e.g. ethylene.

Terpolymers and higher order propylene copolymers, include from about 0.5 to about 25 weight percent of α-olefin comonomers. Preferably, terpolymers and higher order propylene copolymers include from about 3 to about 15 weight percent of α-olefin comonomers, based on the weight of the terpolymer or higher order propylene copolymer. More preferably, terpolymers and higher order propylene copolymers, include from about 6 to about 15 weight percent of α-olefin comonomers. Still more preferably, terpolymers and higher order propylene copolymers, include from about 8 to about 14 weight percent of α-olefin comonomers. In one embodiment, the terpolymer or higher order propylene copolymer includes from about 3 to about 4 weight percent ethylene comonomer and from about 5 to about 7 weight percent $C_4$ comonomer.

Preferably, the low melting point polypropylene is a statistically random copolymer having a distribution of propylene and comonomer residues along the chain. Experimental determination of randomness is described in H. Kakugo, Y Naito, K. Mizunama and T. Miyatake, Macromolecules, pages 1150, 1152 (1982), which is herein incorporated by reference in its entirety.

Low melting point polypropylene may have a triad tacticity of three propylene units of about 75% or greater, about 80% or greater, about 82% or greater, about 85% or greater, or about 90% or greater. In one or more embodiments, low melting point polypropylene has a triad tacticity of three propylene units of from about 50% to about 99%, in other embodiments from about 60% to about 99%, in other embodiments from about 75% to about 99%, in other embodiments from about 80% to about 99%, and in other embodiments from about 60% to about 97%.

Low melting point polypropylenes are from about 0.5% to about 60% crystalline. Preferably, low melting point polypropylenes are from about 1% to about 50%, or from about 1% to 40% crystalline. In one or more embodiments, low melting point polypropylenes are from about 5% to 25% crystalline.

Crystallinity of low melting point polypropylene may also be expressed in terms of percentage of crystallinity. The thermal energy for the highest order of polypropylene, i.e., 100% crystallinity, is estimated to be about 209 J/g. Thus, the crystallinity of low melting point polypropylene may be stated as less than about 60%, or less than about 50%, or less than about 40%. Preferably, the crystallinity of low melting point polypropylene is from about 0.25% to about 30%, and more preferably from about 0.5% to about 25%. Still more preferably, the crystallinity of low melting point polypropylene is from about 0.5% to about 22%, and in other embodiments from about 0.5% to about 20%.

In one embodiment low melting point polypropylenes are characterized by a heat of fusion, ("Hf"), determined by DSC according to ASTM E 793. Low melting point propylene has a heat of fusion that is at least about 0.5 J/g, or at least about 1.0 J/g. Preferably, low melting point propylene has a heat of fusion of at least 1.5 J/g, or at least about 3.0, or at least about 4.0, or at least about 6.0, and in other embodiments at least about 7.0. Low melting point propylene has a heat of fusion of not more than about 80 J/g, or not more than about 70 J/g, or not more than about 60 J/g, or not more than about 50 J/g. Preferably, low melting point propylene has a heat of fusion of not more than about 40 J/g, or not more than about 35 J/g, and in other embodiments of not more than about 30 J/g.

In one embodiment, low melting point polypropylenes have a melt index in dg/min ("MI"), according to ASTM D-1238 at 2.16 kg and 190° C., of not more than about 10, or not more than about 6.5, or not more than about 6, or not more than about 5.5, and in other embodiments not more than about 5.

In one embodiment, the melt flow rate ("MFR") of low melting point polypropylenes, as measured according to ASTM D-1238 at 2.16 kg weight and 230° C., is at least about 0.2 dg/min, or of at least about 0.2 dg/min, or at least about 0.5 dg/min, and in other embodiments at least about 1.0 dg/min. Low melting point polypropylenes have a melt flow rate of not more than about 350 dg/min, or not more than about 100 dg/min. In one or more embodiments, low melting point polypropylenes have a MFR of from about 0.5 dg/min to about 350 dg/min, or from about 2 dg/min to about 30 dg/min, or from about 5 dg/min to about 30 dg/min, or from about 10 dg/min to about 30 dg/min, and in other embodiments from about 10 dg/min to about 25 dg/min.

In one embodiment low melting point polypropylenes have a Mooney viscosity [ML (1+4) @ 125° C.], as determined according to ASTM D1646, of less than about 100, or less than about 75, or less than about 60, and in other embodiments less than about 30.

Low melting point polypropylenes have a weight average molecular weight (Mw) of from about 5,000 to about 5,000,000 g/mole, or from about 10,000 to about 1,000,000 g/mole, or from about 20,000 to about 500,000 g/mole, and in other embodiments a Mw of from about 50,000 to about 400,000 g/mole.

In one embodiment low melting point polypropylenes have a number average molecular weight (Mn) of from about 2,500 to about 2,500,000 g/mole, or from about 5,000 to about 500,000 g/mole, or from about 10,000 to about 250,000 g/mole, and in other embodiments a Mn of from about 25,000 to about 200,000 g/mole.

The molecular weight distribution index (MWD=(Mw/Mn)) of low melting point polypropylenes is from about 1 to about 40, or from about 1 to about 5, or from about 1.8 to about 5, and in other embodiments from about 1.8 to about 3. Techniques for determining the molecular weight (Mn and Mw) and molecular weight distribution (MWD) may be found in U.S. Pat. No. 4,540,753 and Verstrate et al., 21 Macromolecules, 3360 (1988), each of which is herein incorporated by reference in its entirety.

The thermoplastic component may optionally include additional thermoplastic polymers known to those skilled in the art. For example, the thermoplastic component may include functionalized or unfunctionalized thermoplastic polymers, low crystallinity thermoplastic polymers, and conventional additives, e.g., tackifier resins, known to those skilled in the art.

As used herein "high melting point polyolefin" means each polyolefin known to those skilled in the art having a single melting temperature of at least about 150° C. Preferably, high melting point polyolefins have a melting temperature of at least about 165° C. More preferably, high melting point polyolefins have a melting temperature of at least about 170° C. Still more preferably, high melting point polyolefins have a melting temperature of at least about 180° C.

High melting point polyolefins are predominately crystalline, but may vary widely in composition. High melting point polyolefins include, for example, substantially stereoregular polypropylene homopolymer or propylene copolymer containing equal to or less than about 10 weight percent of one or more comonomers, i.e., at least about 90% by weight propylene. Comonomers include those comonomers utilized to prepare the low melting point polypropylene.

Preferably, the high melting point polyolefin is a stereoregular polypropylene. More preferably, high melting point polyolefin is an isotactic polypropylene. Even more preferably, the high melting point polyolefin is an isotactic polypropylene prepared with Ziegler-Natta catalyst.

Thermoplastic polymer compositions exhibit a single melting point that is higher than the melting point of the low melting point polypropylene and approaches the melting point of the high melting point polyolefin. As used herein "single melting point" means a solitary melting temperature when measured by DSC. Although single melting point peaks may exhibit irregular peak formations, such as for example "shoulders," no secondary peaks are observed.

The single melting point of thermoplastic polymer compositions is greater than about 105° C. Preferably, the single melting point of thermoplastic polymer compositions is greater than about 125° C., or greater than about 145° C. More preferably, the single melting point of thermoplastic polymer compositions is greater than about 155° C. Still more preferably, the single melting point of thermoplastic polymer compositions is greater than about 165° C.

Unlike blends of conventional compositions that exhibit a broadened melting point peak representative of conventional blended compositions, the present thermoplastic polymer compositions exhibit a narrow melting point peak. Preferably thermoplastic polymer compositions exhibit a narrow single melting peak having a peak baseline breadth of not more than about 25° C. As used herein, "peak baseline breadth" means the breadth of the melting temperature peak at the peak's baseline as measured by DSC. More preferably, thermoplastic polymer compositions exhibit a peak baseline breadth of not more than about 20° C., and still more preferably not more than about 15° C.

Melting point peaks of thermoplastic polymer compositions may also be characterized as a percentage of the peak baseline breadth of high melting point polyolefins. Preferably, the peak baseline breadth of the thermoplastic polymer composition, as measured by DSC is at least about 80% of the peak baseline breadth of the high melting point polyolefin. More preferably, the peak baseline breadth of the thermoplastic polymer composition is at least about 85% of the peak baseline breadth of the high melting point polyolefin, and still more preferably at least about 90% of the peak baseline breadth of the high melting point polyolefin.

In one or more embodiments, the melting point of thermoplastic polymer compositions is measured according to the following formula:

$$100 * \frac{\left[ \begin{array}{l} Tm[C]\text{high melting point } polyolefin - \\ Tm[C]\text{thermoplastic polymer composition} \end{array} \right]}{Tm[C]\text{high melting point } polyolefin} \leq X \%$$

where X is a representation of the close relationship between the melting points. Preferably, the melting point of the high melting point polyolefin is not more than about 33% of the melting point of the thermoplastic polymer composition, i.e., X≤33. More preferably, X is not more than about 25 or not more than about 20 or not more than about 15.

Compatibility between the low melting point polypropylene and the high melting point polyolefin results in thermoplastic polymer compositions having a single melting point. Compatibility, also referred to in some embodiments as miscibility, between the low melting point polypropylene and the high melting point polyolefin is augmented by similarities in stereoregularity. High melting point polyolefins preferably have substantially the same stereoregularity as the low melting point polypropylene. For example, if the low melting point polypropylene is predominately is tactic polypropylene, then the high melting point polyolefin preferably has is tactic propylene sequences. If the low melting point polypropylene is predominately syndiotactic polypropylene, then the high melting point polyolefin preferably has syndiotactic sequences. Moreover, compatibility is augmented by utilizing low melting point polypropylene having a narrow intermolecular and intramolecular compositional distribution.

Without being bound by theory, it is believed that providing a low melting point polypropylene and a high melting point polyolefin having compatible stereoregularities results in improved adhesion of polymer domains of different crystallinities. Moreover, without being limited by theory, it is believed that further compatibility results in some instances from a co-crystallization phenomenon between propylene sequences of similar stereoregularity, which decreases the difference in crystallization temperature of the blended components.

As a result of increased compatibility, the combined low melting point polypropylene and high melting point polyolefin have a combined melting point closer to that of the high melting point polyolefin and higher than would be expected on a comparison of properties of the individual components. Surprisingly, compatibility between the low melting point polypropylene and high melting point polyolefin results in a single melting temperature approaching that of the high melting point polyolefin thereby increasing commercial utility and range of applications. Comparatively, conventional blends of two crystalline polymers results in a double crystallization temperature as well as a double melting temperature reflecting each polymeric component.

Thermoplastic polymer compositions are composed of from about 0.5 to about 99 weight percent of the low melting point thermoplastic component and from about 1 to about 99.5 weight percent high melting point polyolefin. Preferably, thermoplastic polymer compositions are composed of at least about 30 weight percent of the thermoplastic component and at least about 20 weight percent of high melting point polyolefin. More preferably, thermoplastic polymer compositions are composed of from about 30 to about 70 weight percent of the thermoplastic component and at least about 30 weight percent of high melting point polyolefin. Still more preferably, thermoplastic polymer compositions are composed of from about 40 to about 60 weight percent of the thermoplastic component and from about 40 to about 60 weight percent of high melting point polyolefin. Further thermoplastic polymer compositions are described in the Examples below.

In one or more embodiments, thermoplastic polymer compositions include an elastomeric component composed of materials having elastic properties known to those skilled in the art, such as for example elastomers or rubbers. Elastomers include, for example, elastomeric polypropylene, olefinic elastomeric copolymers, such as for example, ethylene-propylene rubbers, propylene-based rubbery copolymers, and/or ethylene-based plastomers.

Ethylene-propylene rubbers include, for example, ethylene propylene monomer rubber (EPM) and ethylene propylene diene monomer rubber (EPDM). Ethylene-propylene rubbers also include propylene based copolymers polymerized with ethylene, at least one α-olefin monomer, and combinations thereof, and optionally at least one diene monomer.

Examples of α-olefin comonomers include, but are not limited to, propylene, 1-butene, 1-hexene, 4-methyl-1-pentene, 1-octene, 1-decene, or combinations thereof. In one embodiment, α-olefin comonomers include propylene, 1-hexene, 1-octene, or combinations thereof. The diene monomers may include, but are not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof.

Ethylene-propylene rubbers include from about 12 to about 85 weight percent ethylene units deriving from ethylene monomer. Preferably, ethylene-propylene rubbers include from about 20 weight percent to about 80 weight percent, or from about 40 weight percent to about 70 weight percent ethylene units deriving from ethylene monomer. More preferably, ethylene-propylene rubbers include from about 60 weight percent to about 66 weight percent ethylene units deriving from ethylene monomer.

Optionally, ethylene-propylene rubbers include from about 0.1 weight percent to about 15 weight percent diene units deriving from diene monomer. Preferably, ethylene-propylene rubbers include from about 0.5 weight percent to about 12 weight percent, or from about 1 weight percent to about 10 weight percent diene units deriving from diene monomer. More preferably, ethylene-propylene rubbers include from about 2 weight percent to about 8 weight percent diene units deriving from diene monomer.

Ethylene-propylene rubbers have a weight average molecular weight (Mw) that is at least about 50,000, or at least about 100,000, or at least about 200,000, and in other embodiments at least about 300,000. Preferably, the weight average molecular weight of ethylene-propylene rubbers is not more than about 1,000,000, or not more than about 900,000. More preferably, the weight average molecular weight of ethylene-propylene rubbers is not more than about 800,000.

In one or more embodiments, ethylene-propylene rubbers have a number average molecular weight (Mn) that is at least about 20,000. Preferably, ethylene-propylene rubbers have a number average molecular weight of at least about 60,000, or at least about 100,000, and in other embodiments at least about 150,000. Preferably, the number average molecular weight of ethylene-propylene rubber is not more than about 400,000, or not more than about 300,000, and in other embodiments not more than about 250,000.

Ethylene-propylene rubbers may also be characterized as having a Mooney viscosity of from about 15 to about 500 or from about 50 to about 450. Thermoplastic polymer compositions may optionally employ oil-extended forms of high molecular weight polymers when thermoplastic polymer compositions are prepared with high molecular weight elastomers. These oil-extended polymers typically include from about 15 to about 100 parts by weight, per 100 parts by weight rubber ("phr"), of a paraffinic oil. The Mooney viscosity of these oil-extended polymers may be from about 35 to about 80 or from about 45 to about 70.

Unless otherwise specified, Mooney viscosity is reported herein as ML (1+4 @125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.)

More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML (1+4@125° C.). For purposes herein, this modified Mooney determination is referred to as MST—Mooney Small Thin. ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). It should be noted that the run time of 4 minutes at the end of which the Mooney reading is taken remains the same as the standard conditions.

One MST point is approximately equivalent to 5 mL points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML (1+4 @125° C.) value equivalent. The MST rotor used herein was prepared and utilized according to the following specifications: The rotor should have a diameter of 30.48±0.03 mm and a thickness of 2.8±0.03 mm (determined from the tops of serrations) and a shaft of 11 mm or less in diameter. The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch. The rotor is positioned in the center of the die cavity such that the centerline of the rotor disk coincides with the centerline of the die cavity to within a tolerance of ±0.25 mm. A spacer or a shim may be used to raise the shaft to the midpoint, consistent with practices typical in the art for Mooney determination. The wear point (cone shaped protuberance located at the center of the top face of the rotor) shall be machined off flat with the face of the rotor.

Mooney viscosities of multimodal polymer compositions may be determined on blends of polymers herein. The Mooney viscosity of a particular component of blends is obtained herein using the following formula:

$$\log ML = nA \log MLA + nB \log MLB$$

wherein all logarithms are to the base 10; ML is the Mooney viscosity of a blend of two polymers A and B each having individual Mooney viscosities MLA and MLB, respectively; nA represents the wt. % fraction of polymer A in the blend; and nB represents the wt. % fraction of the polymer B in the blend.

Ethylene-propylene rubbers may be characterized as having an intrinsic viscosity, as measured in Decalin at 135° C., of from about 2 dl/g to about 8 dl/g, or from about 3 dl/g to about 7 dl/g, or from about 4 dl/g to about 6.5 dl/g.

Elastomeric copolymers suitable for use in the present compositions are commercially available under the tradenames Vistalon™ (ExxonMobil Chemical Co.), Keltan™ (DSM Copolymers), Nordel™ IP & Nordel MG™ (The Dow Chemical Company), Royalene™ (Lion Corporation) and Buna™ (Lanxess).

Thermoplastic polymer compositions contain a sufficient amount of the elastomeric component to form rubbery compositions of matter. The skilled artisan will understand that rubbery compositions of matter include, but are not limited to for example, those compositions having ultimate elongations greater than 100 percent, and that quickly retract to 150% or less of their original length within about 10 minutes after being stretched to 200% of their original length and held at 200% of their original length for about 10 minutes.

In one or more embodiments, thermoplastic polymer compositions are characterized with respect to 100 parts of elastomeric component (phr). Accordingly, thermoplastic polymer compositions are composed of from about 5 to about 500 phr of thermoplastic component. Preferably, thermoplastic polymer compositions are composed of from about 25 to about 400 phr of thermoplastic component. In other embodiments, thermoplastic polymer compositions are composed of from about 50 to about 250 phr of thermoplastic component.

Thermoplastic polymer compositions may optionally include additives known to those skilled in the art, such as for example, processing oils, polymeric processing additives, functionalized tackifier resins, reinforcing and non-reinforcing fillers, antioxidants, stabilizers, lubricants, anti-blocking agents, anti-static agents, waxes, foaming agents, pigments, flame retardants, and combinations thereof. Thermoplastic polymer compositions are composed of not more than about 50 weight percent of optional additives.

Processing oils known to those skilled in the art include, for example, rubber processing oils, mineral oils, synthetic oils, or combinations thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

Exemplary synthetic oils include polyisobutylene, poly (isobutylene-co-butene), polybutadiene, poly(butadiene-co-butene), and mixtures thereof. In one or more embodiments, synthetic oils may include polylinear α-olefins, poly-branched α-olefins, hydrogenated poly-α-olefins, and mixtures thereof.

Useful synthetic oils are commercially available as Polybutene™ from Soltex in Houston, Tex., Indopol™ from BP in Great Britain, and Parapol™ from ExxonMobil Chemical. Oligomeric copolymers deriving from butadiene and its comonomers are commercially available under the tradename Ricon Resin™ (Sartomer). White synthetic oil is available under the tradenames SPECTRASYN™ and ELEVASTT™ (ExxonMobil), formerly SHF Fluids (Mobil). These oils have low volatility and excellent low temperature properties, e.g., very low pour points.

The quantity of processing oil utilized depends upon the properties desired and is readily identified by those skilled in the art, with the upper limit depending upon the compatibility of the particular oil and blend ingredients. This limit is exceeded when excessive exuding of extender oil occurs.

Polymeric processing additives include polymeric resins that have a high melt flow index, such as for example, both linear and branched polymers that have a melt flow rate of at least about 500 dg/min. Preferably, polymeric processing additives exhibit a melt flow rate of at least about 750 dg/min, or more preferably at least about 1000 dg/min, or at least about 1200 dg/min, and still more preferably at least about 1500 dg/min.

Mixtures of both linear and branched polymeric processing additives and combinations thereof may be employed. Linear polymeric processing additives include, for example, polypropylene homopolymers, and branched polymeric processing additives include, for example, diene-modified polypropylene polymers.

Functionalized tackifier resins, which may also be referred to as a functionalized hydrocarbon resin, include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof.

In one embodiment, functional groups include a succinic anhydride group, or corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon resin. Functionalized tackifier resins include grafted hydrocarbon resins as disclosed in U.S. Patent Publication Nos. 2004/0260021 A1 and 2004/0266947 A1, which are each herein incorporated by reference in their entireties.

Other exemplary tackifer resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In embodiments including a functionalized tackifier resin, thermoplastic polymer compositions include, based on 100 parts of elastomeric component, from about 1 to about 50 parts, or from about 7 to about 40 parts, and in other embodiments from about 15 to about 35 functionalized tackifier resin.

Other fillers and extenders that may be utilized include conventional inorganics such as calcium carbonate, clays, silica, talc, titanium dioxide, carbon black, and others known to those skilled in the art. Preferably, carbon black is employed in thermoplastic polymer compositions. The amount of carbon black that is utilized depends, at least in part, upon the type of carbon black and the amount of process oil that is used.

In embodiments including optional additives, thermoplastic polymer compositions include, based on 100 parts of elastomeric component, from about 1 to about 200 parts, or from about 2 to about 100 parts, and in other embodiments from about 3 to about 50 parts of optional additives.

In general, thermoplastic polymer compositions are prepared by providing a thermoplastic component, providing a high melting point polyolefin, and combining the thermoplastic component and high melting point polyolefin to form a thermoplastic polymer composition having a single melting point. Thermoplastic components and high melting point polyolefins are provided by techniques known to those skilled in the art, such as for example conventional synthesis techniques and purchasing commercial embodiments.

Propylene polymers are prepared by polymerization reactions known to those skilled in the art. For example, homopolymerization of propylene occurs in a single stage or multiple stage reactor. Similarly, copolymers are obtained by copolymerizing propylene and comonomers in a single stage or multiple stage reactor.

Polymerization methods include high pressure, slurry, gas, bulk, solution phase, or a combination thereof, using a including traditional Brookhart catalysts, Ziegler-Natta catalyst, or a single-site catalyst, such as for example vanadium catalysts and Group IV-VI metallocenes. Methods for making and using catalysts are well known in the art. The catalyst is fed to a reactor either separately or premixed. The catalyst used is preferably one which has substantial isospecificity.

In some embodiments, a Ziegler-Natta catalyst is used in a first reactor and a metallocene catalyst is used in a second reactor. Alternatively, a Ziegler-Natta catalyst is used in a first reactor and a Ziegler-Natta catalyst or a combination of Ziegler-Natta catalyst and a metallocene catalyst are used in the second reactor.

In some embodiments, a metallocene catalyst is utilized in a first reactor and a Ziegler-Natta catalyst is utilized in a second reactor. Alternatively, metallocene catalyst is utilized in a first reactor and a metallocene catalyst or a combination of metallocene catalyst and a Ziegler-Natta catalyst are used in the second reactor.

In further embodiments, a combination of metallocene catalyst and Ziegler-Natta catalyst are utilized in a first reactor and a Ziegler-Natta catalyst or metallocene catalyst is utilized in a second reactor.

Preferably, the catalyst system includes a metallocene catalyst. For example, the catalyst may be a cyclopentadienyl metallocene complex which has two cyclopentadienyl ring systems for ligands or monocyclopentadienyl metallocene catalyst. The metallocene complexes are activated with an alumoxane, e.g. methylalumoxane (MAO), or a non-coordinating anion (NCA). Optionally, a catalyst scavenger, such as for example a trialkyl aluminum, may be added to the reactor feed(s) to prevent catalyst deactivation. Exemplary metallocene catalysts are described in U.S. Pat. Nos. 4,530,914 and 5,391,790, each of which is herein incorporated by reference in its entirety.

Polymerization may be carried out by a continuous or batch process and may include use of chain transfer agents, scavengers, or other such additives as deemed applicable by those skilled in the art. In a preferred embodiment, thermoplastic elastomer compositions are prepared in series reactors, which are known to those skilled in the art.

Exemplary polymerization reactions are conducted by reacting monomers in the presence of a catalyst system at a temperature of from about −50 degrees Celsius to about 200 degrees Celsius for a time sufficient to form the subject polymer, e.g., from about 1 second to about 10 hours to produce a copolymer having a weight average molecular weight of from about 5,000 or less to about 1,000,000 or more and a molecular weight distribution of from about 1.8 to about 4.5.

While methods of preparing propylene polymers include utilizing a catalyst system in the liquid phase (slurry, solution, suspension or bulk phase or combination thereof), gas phase polymerization may also be utilized. When utilizing a gas phase, slurry phase, or suspension phase polymerization, the catalyst systems will preferably be a supported catalyst. Exemplary catalysts are described in U.S. Pat. No. 5,057,475, which is herein incorporated by reference in its entirety.

In embodiments including an elastomeric component, the thermoplastic and elastomeric components are prepared and then combined by any technique that provides an intimate mixture of components. For example, the thermoplastic and elastomeric components are combined by melt pressing/folding/rolling, melt blending, solution blending, continuous mixing in single and twin screw mixing extruders, utilizing static mixers for mixing molten polymer streams of low viscosity, or impingement mixers. Mixing is complete when the blend exhibits a substantial homogeneous morphology of thermoplastic and elastomeric components.

Preferably, the thermoplastic and elastomeric components are blended by polymerization in series reactors, i.e., multi-stage polymerization. As used herein, "series reactor" and "multi-stage reactor" are used interchangeably. Multi-stage polymerization techniques utilize at least two reactors known to those skilled in the art, such as for example, two or more continuous flow, stirred tank reactors in series. Multi-stage polymerization methods provide broad control over (a) the amount of components, (b) the component composition, and (c) component molecular weight. Exemplary multi-stage reactor systems are disclosed in U.S. Pat. Nos. 6,319,998, 4,016,342, and 4,306,041, each of which is herein incorporated by reference in its entirety.

Generally, multi-stage polymerization includes methods of synthesizing polymer blends by first feeding a first set of monomers, a solvent, and a catalyst in predetermined proportions to a first reactor. Then, the first reactor is operated to polymerize the first set of monomers thereby producing an effluent containing a first polymer. The effluent is fed to a second reactor. A second set of monomers in predetermined proportions is also fed to the second reactor. Optionally, a solvent is fed to the second reactor. The second reactor is operated to polymerize the second set of monomers thereby producing a second polymer where, optionally additional amount of catalyst may be added. The polymer product is recovered after polymerization by any technique well known in the art such as, for example, steam stripping followed by extrusion drying or by devolatilizing extrusion. After polymerization, the elastomeric component and thermoplastic component are compounded with a high melting point polyolefin. Preferably, multi-stage polymerization methods are homogeneous solution phase polymerizations.

The thermoplastic component and elastomeric component are polymerized so that they form a substantially miscible mixture following recovery of the reactor product. The presence of multiple phases is readily measured by standard polymer characterization techniques such as, for example, light microscopy, electron microscopy, or atomic force microscopy (AFM).

Polymer composition is controlled by the relative amount of each monomer fed to each reactor. For example, in a two reactor series configuration, unreacted monomer from the first reactor flows into the second reactor. Monomer added to the second reactor is preferably enough to adjust the composition of the feed to the desired level, taking into account the monomer carry over. Depending on reaction conditions in the first reactor, e.g., catalyst concentration, temperature, monomer feed rates, etc., unreacted monomer leaving reactor one and flowing to reactor two may be in excess of the amount needed to make a desired composition in the second reactor. In that event, the configuration may be switched from series to parallel.

Polymer molecular weight is governed by reactor temperature, monomer concentration, and by addition of chain transfer agents such as hydrogen. With metallocene catalysts, for example, polymer molecular weight usually declines as reaction temperature increases. Moreover, high unreacted monomer concentration in the reactor generally increases polymer molecular weight. Moreover, polymer composition may affect polymer molecular weight due to chain transfer processes involving alpha-olefin comonomers. In general, it is often observed that molecular weight decreases as the alpha-olefin content of the polymer increases. In the context of molecular weight control, the alpha-olefin comonomer may be viewed in some instances as a chain transfer agent.

Polymerization reactors are preferably cooled by reactor jackets or cooling coils, autorefrigeration, prechilled feeds, or combinations of each. Reactor cooling induces a temperature difference between reactors which is helpful for controlling polymer molecular weight.

After the elastomeric component is combined with the thermoplastic component, the elastomeric component is optionally cured, or crosslinked, by dynamic vulcanization. As used herein "dynamic vulcanization" means a vulcanization or curing process for elastomers and rubbers contained in a composition containing a thermoplastic component, wherein the elastomer or rubber is partially or substantially crosslinked or vulcanized under conditions of high shear or elongational flow at a temperature above the melting point of the thermoplastic. The elastomeric component is cured either before or after addition of the high melting point polyolefin. Additional additives, such as for example additional thermoplastic resin or tackifier resins, may be added after dynamic vulcanization. Preferably, the elastomeric component is highly cured, i.e., substantially completely cured.

The degree of curing can be measured by determining the amount of elastomer that is extractable from the thermoplastic polymer composition by using cyclohexane or boiling xylene as an extractant. This method is disclosed in U.S. Pat. No. 4,311,628, which is herein incorporated by reference in its entirety. Preferably, the degree of curing is substantially complete so that not more than about 10 weight percent of elastomer is extractable by cyclohexane at 23° C. as described in U.S. Pat. Nos. 5,100,947 and 5,157,081, each herein incorporated by reference in their entireties. More preferably, not more than about 6 weight percent, or not more than about 5 weight percent of elastomer is extractable by cyclohexane. Still more preferably, not more than about 3 weight percent of elastomer is extractable by cyclohexane.

Alternatively, in one or more embodiments, the elastomeric component has a degree of cure such that the crosslink density is at least $4 \times 10^{-5}$, or at least $7 \times 10^{-5}$, and in other embodiments at least $10 \times 10^{-5}$ moles per milliliter of elastomeric component as described in "Crosslink Densities and Phase Morphologies in Dynamically Vulcanized TPEs," by Ellul et al., 68 *Rubber Chemistry and Technology*, vol. 68, pp. 573-584 (1995), which is herein incorporated by reference in its entirety.

The elastomeric component is cured by curing agents known to those skilled in the art. For example, where the elastomeric component includes an olefinic elastomeric copolymer, the cure agent may include peroxides, phenolic resins, free radical curatives, silicon-containing curatives (sometimes referred to as "hydrosilylation agents" readily known by those skilled in the art), or other curatives conventionally employed. In embodiments where the elastomeric component includes butyl rubber the cure agents are preferably phenolic resins, silicon-containing curing systems, zinc oxide systems, or amine systems. The curing agent is present in an amount effective to produce the desired amount of cure within the elastomeric component.

Phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. In one or more embodiments, phenolic resins are utilized in conjunction with a halogen source, e.g., stannous chloride, metal oxide, or reducing compound, e.g., zinc oxide.

Phenolic resins are commercially available under the tradenames SP-1044 and SP-1045 from Schenectady International in Schenectady, N.Y., which may be referred to as alkylphenol-formaldehyde resins (also available in a 30/70 weight percent paraffinic oil solution under the trade name HRJ-14247A).

In one embodiment, the elastomeric component is simultaneously cured and dispersed as fine particles within the thermoplastic component, although other morphologies may also exist. Dynamic vulcanization may be effected by mixing the elastomeric component and curative at elevated temperature under low or high shear in conventional mixing equipment known to those skilled in the art such as, for example, roll mills, Banbury mixers, Brabender mixers, continuous mixers, mixing extruders.

Despite the fact that the elastomeric component may be partially or fully cured, thermoplastic polymer compositions can be processed and reprocessed by conventional plastic processing techniques such as thermoforming operations, extrusion, injection molding, blow molding, injection-compression molding, compression molding, and rotational molding. The elastomeric component within thermoplastic polymer compositions may be in the form of finely-divided and well-dispersed particles of vulcanized or cured rubber within a continuous thermoplastic phase or matrix. In other embodiments, a co-continuous morphology or a phase inversion is achieved.

In embodiments where the cured elastomeric component is in the form of finely-divided and well-dispersed particles within the thermoplastic component, particles of elastomeric component have an average diameter of less than about 500 µm. Preferably, elastomeric component particles have an average diameter of less than about 50 µm, or less than about 30 µm. More preferably, elastomeric component particles have an average diameter of less than about 10 µm, or less than about 5 µm. In one or more embodiments, elastomeric component particles have an average diameter of less than about 1 µm.

In other embodiments, at least about 50% of elastomeric component particles have an average diameter of less than about 5 µm. Preferably, at least about 60% of elastomeric component particles have an average diameter of less than about 2 µm. More preferably, at least about 70% of elastomeric component particles have an average diameter of less than about 1 µm.

Thermoplastic polymer compositions are useful for manufacturing articles or devices of commerce known to those skilled in the art. For example, articles and devices for consumer and industrial applications have advantageous properties when formed from thermoplastic polymer compositions. Exemplary articles include automobile parts, including exterior and interior trim pieces, instrument panels, interior knee pads, brake parts such as cups, coupling disks and diaphragm cups, boots for constant velocity joints and rack and pinion joints, hydraulically or pneumatically operated equipment parts, body plugs and door panels. Other industrial uses include o-rings, valve seats, and valve guides. Consumer applications include grips or grippable surfaces on a number of consumer goods including, for example, kitchen utensils, tools, toothbrushes, pens and pencils, and athletic equipment. Thermoplastic polymer compositions may also be used in numerous damping applications such as in the formation of gaskets, bumpers, housings, and motor mounts. Further applications may include, for example, seals, including weather seal components, in the automotive, and construction industries, furniture spacers, and cable grommets. Other applications may include hoses, belts, boots, and elastic fibers.

In other embodiments, also provided are:

A. A thermoplastic polymer composition comprising:
   a thermoplastic component comprising low melting point copolymer having a melting temperature of not more than about 150° C. composed of stereoregular polypropylene segments and from about 0.1 to about 5.0 weight percent of comonomer, based on the weight of the low melting point copolymer, and a high melting point polyolefin having a melting point greater than the melting point of the low melting point copolymer,
   wherein the thermoplastic polymer composition has a single melting point.
B. The thermoplastic polymer composition of embodiment A, wherein the comonomer is ethylene, or a $C_4$ to $C_{20}$ α-olefin.
C. The thermoplastic polymer composition of embodiment A or B, wherein the low melting point copolymer is prepared with a single site catalyst, Ziegler Natta catalyst, or combinations thereof.
D. The thermoplastic polymer composition of any of embodiments A-C, wherein the high melting point polyolefin is prepared with a single site catalyst, Ziegler Natta catalyst, or combinations thereof.
E. The thermoplastic polymer composition of any of embodiments A-D, wherein the low melting point copolymer is prepared with at least one catalyst selected from the group consisting of vanadium catalysts, Group IV-VI metallocenes, and Brookhart catalysts.
F. The thermoplastic polymer composition of any of embodiments A-E, wherein the high melting point polyolefin is prepared with at least one catalyst selected from the group consisting of vanadium catalysts, Group IV-VI metallocenes, and Brookhart catalysts.
G. The thermoplastic polymer composition of any of embodiments A-F, wherein the high melting point polyolefin is a substantially stereoregular polypropylene having substantially the same tacticity as the stereoregular polypropylene segments of the copolymer.
H. The thermoplastic polymer composition of any of embodiments A-G, wherein the thermoplastic polymer composition is composed of from about 20 to about 60 weight percent of high melting point polyolefin.
I. The thermoplastic polymer composition of any of embodiments A-H, further comprising an elastomeric component.
J. The thermoplastic polymer composition of any of embodiments A-I, wherein the thermoplastic polymer composition is a thermoplastic vulcanizate.
K. The thermoplastic polymer composition of any of embodiments A-J, wherein the single melting point of the thermoplastic polymer composition is greater than about 105° C.
L. The thermoplastic polymer composition of any of embodiments A-K, wherein the melting point of the thermoplastic polymer composition is within at least about 33% of the melting point of the high melting point polyolefin according to the follow formula:

$$100 * \frac{\left[\begin{array}{l}Tm[C]\text{high melting point } polyolefin - \\ Tm[C]\text{thermoplastic polymer composition}\end{array}\right]}{Tm[C]\text{high melting point } polyolefin} \leq 33\%$$

M. An article comprising the thermoplastic polymer composition of any of embodiments A-L.
N. A thermoplastic polymer composition comprising:
   a thermoplastic component comprising low melting point copolymer having a melting temperature of not more than about 150° C. composed of stereoregular polypropylene segments and two or more comonomers, and
   a high melting point polyolefin having a melting point greater than the melting point of the low melting point copolymer,
   wherein the thermoplastic polymer composition has a single melting point.
O. The thermoplastic polymer composition of embodiment N, wherein the two or more comonomers are selected from the group consisting of ethylene and $C_4$ to $C_{20}$ α-olefin comonomers.
P. The thermoplastic polymer composition of embodiment N or O, wherein the copolymer is composed of from about 0.1 to about 20.0, or from about 0.1 to about 12, or from about 0.1 to about 10, or from about 1 to about 10, or from about 1 to about 9 weight percent of comonomers, based on the weight of the copolymer.
Q. The thermoplastic polymer composition of any of embodiments N-P, wherein the low melting point copolymer is prepared with a single site catalyst, Ziegler Natta catalyst, or combinations thereof.
R. The thermoplastic polymer composition of any of embodiments N-Q, wherein the high melting point polyolefin is prepared with a single site catalyst, Ziegler Natta catalyst, or combinations thereof.
S. The thermoplastic polymer composition of any of embodiments N-R, wherein the low melting point copolymer is prepared with at least one catalyst selected from the group consisting of vanadium catalysts, Group IV-VI metallocenes, and Brookhart catalysts.

T. The thermoplastic polymer composition of any of embodiments N-S, wherein the high melting point polyolefin is prepared with at least one catalyst selected from the group consisting of vanadium catalysts, Group IV-VI metallocenes, and Brookhart catalysts.

U. The thermoplastic polymer composition of any of embodiments N-T, wherein the high melting point polyolefin is stereoregular polypropylene having substantially the same tacticity as the stereoregular polypropylene segments of the copolymer.

V. The thermoplastic polymer composition of any of embodiments N-U, wherein the thermoplastic polymer composition is composed of from about 20 to about 60 weight percent of high melting point polyolefin.

W. The thermoplastic polymer composition of any of embodiments N-V, further comprising an elastomeric component dispersed within the thermoplastic component.

X. The thermoplastic polymer composition of any of embodiments N-W, wherein the thermoplastic polymer composition is a thermoplastic vulcanizate.

Y. The thermoplastic polymer composition of any of embodiments N-X, wherein the copolymer is a terpolymer comprising polypropylene, ethylene comonomer, and a $C_4$ to $C_{20}$ α-olefin comonomer.

Z. The thermoplastic polymer composition of embodiment Y, wherein the terpolymer comprises ethylene comonomer and $C_4$ comonomer.

AA. The thermoplastic polymer composition of embodiment Y, wherein the terpolymer comprises ethylene comonomer and $C_8$ comonomer.

BB. The thermoplastic polymer composition of embodiment Y or Z, wherein the terpolymer comprises from about 3 to about 4 weight percent ethylene comonomer and from about 5 to about 7 weight percent $C_4$ comonomer.

CC. The thermoplastic polymer composition of embodiment Y, wherein the copolymer is a terpolymer comprising polypropylene and $C_4$ to $C_{20}$ α-olefin comonomers.

DD. The thermoplastic polymer composition of any of embodiments N-CC, wherein the single melting point of the thermoplastic polymer composition is greater than about 105° C.

EE. The thermoplastic polymer composition of any of embodiments N-DD, wherein the melting point of the thermoplastic polymer composition is within at least about 33% of the melting point of the high melting point polyolefin according to the follow formula:

$$100 * \frac{\left[\begin{array}{l} Tm[C] \text{high melting point } polyolefin - \\ Tm[C] \text{thermoplastic polymer composition} \end{array}\right]}{Tm[C] \text{high melting point } polyolefin} \leq 33\%$$

FF. An article comprising the thermoplastic polymer composition of any of embodiments N-FF.

GG. A method of elevating the melting point of a thermoplastic polymer composition comprising the steps of:
(a) providing a thermoplastic component comprising a low melting point copolymer having a melting temperature of not more than about 150° C. composed of stereoregular polypropylene segments and from about 0.1 to about 7.0 weight percent, based on the weight of the copolymer, of comonomer, and
(b) combining the thermoplastic component with a high melting point polyolefin having a melting point greater than the melting point of the low melting point copolymer,
wherein the thermoplastic polymer composition has a single melting point.

HH. The method of elevating the melting point of a thermoplastic polymer composition of embodiment GG, further comprising the steps of:
providing an elastomeric component, and
combining the thermoplastic component and the elastomeric component either before or after adding the high melting point polyolefin.

II. The method of elevating the melting point of a thermoplastic polymer composition of embodiment HH, further comprising the step of curing the elastomeric component.

JJ. The method of elevating the melting point of a thermoplastic polymer composition of any of embodiments GG-II, wherein the thermoplastic component is polymerized in solution.

KK. The method of elevating the melting point of a thermoplastic polymer composition of any of embodiments GG-JJ, wherein the single melting point of the thermoplastic polymer composition is greater than about 105° C.

LL. A method of elevating the melting point of a thermoplastic polymer composition comprising the steps of:
(a) providing a thermoplastic component comprising a low melting point copolymer having a melting temperature of not more than about 150° C. composed of stereoregular polypropylene segments and two or more comonomers,
(b) combining the thermoplastic component with a high melting point polyolefin having a melting point greater than the melting point of the low melting point copolymer,
wherein the thermoplastic polymer composition has a single melting point.

MM. The method of elevating the melting point of a thermoplastic polymer composition of embodiment LL, further comprising the steps of:
providing an elastomeric component, and
combining the thermoplastic component and the elastomeric component.

NN. The method of elevating the melting point of a thermoplastic polymer composition of embodiment MM, further comprising the step of curing the elastomeric component.

OO. The method of elevating the melting point of a thermoplastic polymer composition of any of embodiments LL-NN, wherein the thermoplastic component is polymerized in solution.

PP. The method of elevating the melting point of a thermoplastic polymer composition of any of embodiments LL-OO, wherein the copolymer is composed of from about 0.1 to about 20.0 weight percent, based on the weight of the copolymer, of comonomer.

QQ. The method of elevating the melting point of a thermoplastic polymer composition of any of embodiments LL-OO, wherein the copolymer is composed of from about 0.1 to about 12.0 weight percent, based on the weight of the copolymer, of comonomer.

RR. The method of elevating the melting point of a thermoplastic polymer composition of any of embodiments LL-OO, wherein the copolymer is composed of from about 0.1 to about 10.0 weight percent, based on the weight of the copolymer, of comonomer.

SS. The method of elevating the melting point of a thermoplastic polymer composition of any of embodiments LL-RR, wherein the two or more comonomers are selected from the group consisting of ethylene and $C_4$ to $C_{20}$ α-olefin comonomers.

TT. The method of elevating the melting point of a thermoplastic polymer composition of any of embodiments LL-RR, wherein the copolymer is a terpolymer comprising polypropylene, ethylene comonomer, and a $C_4$ to $C_{20}$ α-olefin comonomer.

UU. The method of elevating the melting point of a thermoplastic polymer composition of embodiment TT, wherein the terpolymer comprises ethylene comonomer and $C_4$ comonomer.

VV. The method of elevating the melting point of a thermoplastic polymer composition of embodiment TT, wherein the terpolymer comprises ethylene comonomer and $C_8$ comonomer.

WW. The method of elevating the melting point of a thermoplastic polymer composition of any of embodiments LL-RR, wherein the copolymer is a terpolymer comprising polypropylene and $C_4$ to $C_{20}$ α-olefin comonomers.

XX. The method of elevating the melting point of a thermoplastic polymer composition of any of embodiments LL-WW, wherein the single melting point of the thermoplastic polymer composition is greater than about 105° C.

YY. The thermoplastic polymer composition of any of embodiments LL-XX, wherein the low melting point copolymer is prepared with a single site catalyst, Ziegler Natta catalyst, or combinations thereof ZZ. The thermoplastic polymer composition of any of embodiments LL-YY, wherein the high melting point polyolefin is prepared with a single site catalyst, Ziegler Natta catalyst, or combinations thereof.

AAA. The thermoplastic polymer composition of any of embodiments LL-ZZ, wherein the low melting point copolymer is prepared with at least one catalyst selected from the group consisting of vanadium catalysts, Group IV-VI metallocenes, and Brookhart catalysts.

BBB. The thermoplastic polymer composition of any of embodiments LL-AAA, wherein the high melting point polyolefin is prepared with at least one catalyst selected from the group consisting of vanadium catalysts, Group IV-VI metallocenes, and Brookhart catalysts.

The above description is intended to be illustrative, and should not be considered limiting. Persons skilled in the art will recognize that various modifications may be made without departing from the spirit and scope of the invention. Accordingly, this description will be deemed to include all such modifications that fall within the appended claims and their equivalents.

EXAMPLES

The following examples, which are not intended to be limiting, present certain embodiments and advantages of the thermoplastic polymer compositions disclosed herein. Unless otherwise indicated, any percentages are on a weight basis.

Physical properties of compositions were determined generally in accordance with the following test methods:

| Property | Test Method |
|---|---|
| Specific Gravity | ISO 1183 |
| Hardness | ISO 868-85, Shore A and Shore D, 5 secs |
| Elongation at break | ISO 37 |
| Ultimate tensile strength (UTS) | ISO 37 |
| 100% Modulus (100% Mod.) | ISO 37 |
| Tension Set | ASTM D412 |
| Weight Gain | ASTM D471 |
| LCR | ISO 11443 |
| Compression Set | ASTM D395, Method B |

Example 1

Eleven conventional polyolefin blends, i.e., Conventional Compositions 1-11, were prepared and analyzed. Conventional Composition 2-10 were composed of a conventional low melting point propylene copolymer melt blended with a high melting polyolefin. Conventional Compositions 1 and 11 were respectively composed of unblended conventional low melting point propylene copolymer and high melting polyolefin. The conventional low melting point polypropylene copolymer was composed of 11.9 weight percent ethylene comonomer commercially available as Vistamaxx™ specialty elastomer 23300-39 from ExxonMobil Chemical Co., Houston, Tex. The high melting point polyolefin was an isotactic polypropylene prepared with Ziegler Natta catalyst, which is commercially available as Equistar 51S07A, Sunoco F008F from Sunoco Chemical.

Each Conventional Composition was blended in a conventional Brabender mixer operating at 100 rpm and 160° C. for six minutes. The components of each Conventional Composition are shown below in Table 1:

TABLE 1

| Conventional Composition | Thermoplastic Component, Propylene Copolymer Wt % | High Melting Point Polyolefin Wt % | Wt % Comonomer in Propylene Copolymer |
|---|---|---|---|
| 1 | 100 | 0 | 11.9 |
| 2 | 90 | 10 | 11.9 |
| 3 | 80 | 20 | 11.9 |
| 4 | 70 | 30 | 11.9 |
| 5 | 60 | 40 | 11.9 |
| 6 | 50 | 50 | 11.9 |
| 7 | 40 | 60 | 11.9 |
| 8 | 30 | 70 | 11.9 |
| 9 | 20 | 80 | 11.9 |
| 10 | 10 | 90 | 11.9 |
| 11 | 0 | 100 | 0.0 |

As shown in Table 2 below and FIG. 1, the melting temperature and related thermographic properties of each Conventional Composition were measured by differential scanning calorimetry:

TABLE 2

| Conventional Composition | $T_{m1}$ (° C.) | $\Delta H_{f1}$ (J/g) | $T_{m2}$ (° C.) | $\Delta H_{f2}$ (J/g) | $T_{c1}$ (° C.) | $\Delta H_{c1}$ (J/g) | $T_{c2}$ (° C.) | $\Delta H_{c2}$ (J/g) |
|---|---|---|---|---|---|---|---|---|
| 1st Heat/Cool at 10° C./min | | | | | | | | |
| 1 | 46.6 | 29.0 | — | — | — | — | — | — |
| 2 | 47.9 | 15.9 | 160.1 | 10.2 | 74.1 | 9.5 | 26.4 | 7.7 |
| 3 | 47.1 | 15.8 | 162.1 | 19.9 | 91.9 | 20.1 | 26.0 | 7.8 |
| 4 | 48.1 | 11.7 | 163.4 | 28.6 | 109.7 | 28.9 | 23.1 | 6.6 |

TABLE 2-continued

| Conventional Composition | $T_{m1}$ (°C.) | $\Delta H_{f1}$ (J/g) | $T_{m2}$ (°C.) | $\Delta H_{f2}$ (J/g) | $T_{c1}$ (°C.) | $\Delta H_{c1}$ (J/g) | $T_{c2}$ (°C.) | $\Delta H_{c2}$ (J/g) |
|---|---|---|---|---|---|---|---|---|
| 5 | 47.8 | 10.2 | 163.9 | 37.6 | 110.7 | 39.1 | — | — |
| 6 | 55.3 | 6.1 | 164.3 | 45.2 | 110.2 | 47.5 | — | — |
| 7 | 47.7 | 4.8 | 164.2 | 56.8 | 109.8 | 58.7 | — | — |
| 8 | — | — | 164.4 | 64.2 | 110.0 | 67.7 | — | — |
| 9 | — | — | 165.2 | 74.5 | 110.2 | 77.5 | — | — |
| 10 | — | — | 165.2 | 86.2 | 110.9 | 86.7 | — | — |
| 11 | — | — | 165.6 | 93.4 | 112.4 | 93.9 | — | — |
| 2nd Heat/Cool at 10° C./min | | | | | | | | |
| 1 | 54.8 | 18.0 | — | — | — | — | 10.48 | 17.3 |
| 2 | 54.7 | 18.0 | 161.8 | 10.4 | 74.6 | 9.7 | — | — |
| 3 | 54.8 | 13.5 | 163.2 | 19.4 | 91.1 | 20.6 | — | — |
| 4 | 56.7 | 12.8 | 163.0 | 29.2 | 109.7 | 29.3 | — | — |
| 5 | 56.3 | 9.5 | 163.0 | 41.0 | 110.7 | 40.1 | — | — |
| 6 | 56.5 | 5.2 | 163.9 | 48.4 | 109.9 | 48.1 | — | — |
| 7 | — | — | 163.5 | 60.9 | 109.7 | 60.4 | — | — |
| 8 | — | — | 164.0 | 69.7 | 109.8 | 68.2 | — | — |
| 9 | — | — | 164.0 | 83.4 | 110.0 | 80.0 | — | — |
| 10 | — | — | 164.3 | 89.0 | 110.6 | 87.7 | — | — |
| 11 | — | — | 164.5 | 98.9 | 112.1 | 94.8 | — | — |

As used herein and referring to the DSC technique described above, $T_{m1}$ and $T_{m2}$ are the melting temperatures of the first and second melts respectively, $\Delta H_{f1}$ and $\Delta H_{f2}$ are the heats of fusion of the first and second melts respectively, i.e., the thermal output of the sample. The heats of fusion are recorded as the area under each melting peak curve. $T_{c1}$ is the first non-isothermal crystallization temperature, which is recorded as the temperature of greatest heat generation, $\Delta H_{c1}$ is the first heat of crystallization, which is measured as the area under the $T_{c1}$ peak, $T_{c2}$ is second non-isothermal crystallization temperature, and $\Delta H_{c2}$ is the second heat of crystallization.

Table 2 and FIG. 1 illustrate that blended Conventional Compositions 2-6 exhibited two melting point peaks after the second heat for up to 40 wt. % of the low melting point polymer. Referring to FIG. 1, the lower melting point, $T_{m1}$ is caused by the conventional copolymer. The higher melting point Tm2 is caused by the high melting point polyolefin.

Example 2

Compositions 1-26 were prepared by melt blending a low melting point polypropylene prepared with metallocene catalyst and varying amounts of high melting point polyolefin. An elastomeric component was not included in these compositions.

Test Compositions 1-6 included a low melting point polypropylene composed of substantially isotactic polypropylene segments and propylene regions having minor stereo errors. Test Compositions 7-13 included a low melting point propylene copolymer composed of 0.98 weight percent ethylene and isotactic polypropylene segments. Test Compositions 14-19 included a low melting point propylene copolymer composed of 5.03 weight percent ethylene and isotactic polypropylene segments. Test Compositions 21-26 included a low melting point propylene copolymer composed of 2.41 weight percent ethylene and isotactic polypropylene segments. As shown in Table 3, the compositions included varying amounts of the same high melting point polyolefin, an isotactic polypropylene prepared with Ziegler Natta catalyst, which is commercially available as Equistar 51S07A, Sunoco F008F from Sonoco Corporation.

Each test composition was melt blended in a conventional Brabender mixer operating at 100 rpm and 180° C. with a nitrogen blanket for three minutes. The components of each Test Composition are shown in Table 3:

TABLE 3

| Composition | Low Melting Point Polypropylene Wt % | High Melting Point Polyolefin Wt % | Wt % Comonomer in Low Melting Point Polypropylene |
|---|---|---|---|
| 1 | 100 | 0 | 0 |
| 2 | 90 | 10 | 0 |
| 3 | 80 | 20 | 0 |
| 4 | 70 | 30 | 0 |
| 5 | 60 | 40 | 0 |
| 6 | 50 | 50 | 0 |
| 7 | 100 | 0 | 0.98 |
| 8 | 90 | 10 | 0.98 |
| 9 | 80 | 20 | 0.98 |
| 10 | 60 | 40 | 0.98 |
| 11 | 40 | 60 | 0.98 |
| 12 | 20 | 80 | 0.98 |
| 13 | 10 | 90 | 0.98 |
| 14 | 100 | 0 | 5.03 |
| 15 | 90 | 10 | 5.03 |
| 16 | 85.74 | 14.26 | 5.03 |
| 17 | 66.75 | 33.25 | 5.03 |
| 18 | 50 | 50 | 5.03 |
| 19 | 10 | 90 | 5.03 |
| 20 | 100 | 0 | 2.41 |
| 21 | 90 | 10 | 2.41 |
| 22 | 80 | 20 | 2.41 |
| 23 | 60 | 40 | 2.41 |
| 24 | 40 | 60 | 2.41 |
| 25 | 20 | 80 | 2.41 |
| 26 | 10 | 90 | 2.41 |
| Comparative: 100 wt % High Melting Point Polyolefin | | | |
| 27 | 0 | 100 | 0 |

As shown below in Tables 4 & 5 and FIG. 2, the melting temperature and related thermographic properties were measured by differential scanning calorimetry:

TABLE 4

| Test Comp. | $T_{m1}$ (°C.) | $\Delta H_{f1}$ (J/g) | $T_{m2}$ (°C.) | $\Delta H_{f2}$ (J/g) | $T_{c1}$ (°C.) | $\Delta H_{c1}$ (J/g) |
|---|---|---|---|---|---|---|
| 1st Heat/Cool at 10° C./min | | | | | | |
| 1 | — | — | 138.0 | 68.6 | 99.5 | 69.7 |
| 2 | — | — | 139.2 | 72.2 | 107.3 | 74.3 |
| 3 | — | — | 158.3 | 70.3 | 111.5 | 73.9 |
| 4 | — | — | 159.9 | 75.7 | 112.6 | 79.3 |
| 5 | — | — | 163.3 | 83.9 | 113.8 | 83.9 |
| 6 | — | — | 164.9 | 91.3 | 115.8 | 91.0 |
| 7 | — | — | 134.1 | 66.8 | 96.3 | 65.8 |
| 8 | — | — | 134.9 | 64.8 | 99.6 | 67.2 |
| 9 | — | — | 157.4 | 63.6 | 104.0 | 68.2 |
| 10 | — | — | 160.6 | 71.3 | 108.7 | 72.6 |
| 11 | — | — | 163.8 | 80.1 | 113.5 | 83.3 |
| 12 | — | — | 165.0 | 83.3 | 113.9 | 88.0 |
| 13 | — | — | 167.1 | 87.6 | 112.1 | 88.9 |
| 14 | — | — | 117.9 | 53.0 | 84.1 | 55.3 |
| 15 | 118.5 | 45.2 | 157.4 | 10.6 | 98.0 | 63.0 |
| 16 | — | — | 163.8 | 74.8 | 115.0 | 78.1 |
| 17 | — | — | 165.2 | 87.6 | 115.6 | 88.8 |
| 18 | — | — | 167.1 | 85.2 | 115.1 | 91.3 |
| 19 | — | — | 166.4 | 85.8 | 113.8 | 88.5 |
| 20 | — | — | 120.1 | 52.8 | 84.9 | 56.0 |
| 21 | — | — | 123.5 | 37.7 | 156.8 | 12.0 |
| 22 | — | — | 158.8 | 53.4 | 102.5 | 61.5 |
| 23 | — | — | 161.4 | 63.3 | 110.0 | 68.7 |

TABLE 4-continued

| Test Comp. | $T_{m1}$ (° C.) | $\Delta H_{f1}$ (J/g) | $T_{m2}$ (° C.) | $\Delta H_{f2}$ (J/g) | $T_{c1}$ (° C.) | $\Delta H_{c1}$ (J/g) |
|---|---|---|---|---|---|---|
| 24 | — | — | 164.1 | 70.8 | 112.2 | 72.2 |
| 25 | — | — | 165.2 | 82.3 | 113.5 | 86.2 |
| 26 | — | — | 165.3 | 88.2 | 113.7 | 90.2 |
| Comparative: 100 wt % High Melting Point Polyolefin | | | | | | |
| 27 | — | — | 166.9 | 90.2 | 115.8 | 93.6 |

TABLE 5

| Test Comp. | $T_{m1}$ (° C.) | $\Delta H_{f1}$ (J/g) | $T_{m2}$ (° C.) | $\Delta H_{f2}$ (J/g) | $T_{c1}$ (° C.) | $\Delta H_{c1}$ (J/g) |
|---|---|---|---|---|---|---|
| 2nd Heat/Cool at 10° C./min | | | | | | |
| 1 | — | — | 138.5 | 76.6 | 99.9 | 73.1 |
| 2 | — | — | 142.3 | 80.8 | 107.4 | 77.5 |
| 3 | — | — | 151.2 | 84.3 | 111.9 | 81.7 |
| 4 | — | — | 154.8 | 89.4 | 113.0 | 85.0 |
| 5 | — | — | 161.4 | 92.3 | 114.0 | 90.1 |
| 6 | — | — | 161.9 | 96.8 | 115.9 | 93.7 |
| 7 | — | — | 132.6 | 72.0 | 96.2 | 68.8 |
| 8 | — | — | 138.0 | 74.4 | 100.0 | 71.9 |
| 9 | — | — | 158.7 | 72.8 | 104.0 | 72.0 |
| 10 | — | — | 161.9 | 76.2 | 108.7 | 76.2 |
| 11 | — | — | 159.8 | 89.7 | 113.6 | 87.0 |
| 12 | — | — | 163.1 | 92.9 | 113.9 | 90.9 |
| 13 | — | — | 164.2 | 96.2 | 112.0 | 92.2 |
| 14 | — | — | 120.3 | 62.0 | 84.0 | 58.2 |
| 15 | 111.6 | 55.6 | 158.2 | 14.4 | 98.1 | 67.6 |
| 16 | — | — | 161.5 | 85.7 | 115.1 | 85.9 |
| 17 | — | — | 163.9 | 95.2 | 115.6 | 92.2 |
| 18 | — | — | 165.3 | 94.1 | 115.0 | 93.3 |
| 19 | — | — | 165.0 | 93.8 | 113.7 | 91.8 |
| 20 | — | — | 121.6 | 61.2 | 85.3 | 61.9 |
| 21 | 113.0 | 56.7 | 157.5 | 11.8 | 96.5 | 67.9 |
| 22 | 113.7 | 40.1 | 159.6 | 31.1 | 102.7 | 70.8 |
| 23 | 120.1 | 30.2 | 162.5 | 50.8 | 110.3 | 79.6 |
| 24 | — | — | 163.1 | 81.9 | 112.3 | 82.1 |
| 25 | — | — | 162.3 | 90.0 | 113.1 | 89.3 |
| 26 | — | — | 163.3 | 94.9 | 113.4 | 93.3 |
| Comparative: 100 wt % High Melting Point Polyolefin | | | | | | |
| 27 | — | — | 165.0 | 98.3 | 115.8 | 95.2 |

Figure 2:
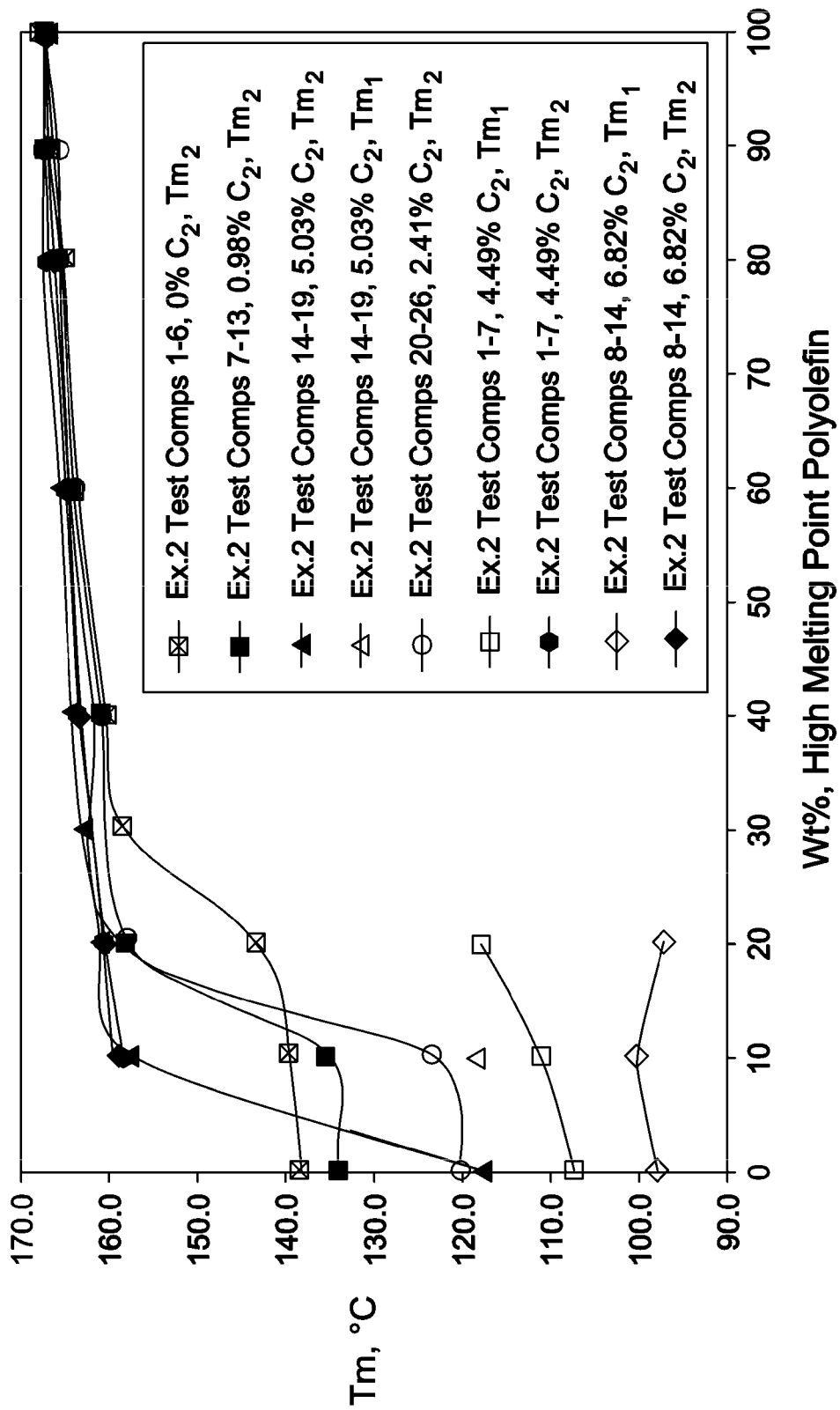
FIG. 2 is an X-Y graph of melting temperature versus weight percent high melting point polyolefin that illustrates the melting temperatures of exemplary thermoplastic polymer compositions.

As shown in Tables 4 & 5 and FIG. 2, thermoplastic polymer compositions having as much as 5.03 weight percent co-monomer exhibited a single melting point temperature over a broad range of compositions. Moreover, while maintaining a single melting point, the compositions exhibited a melting point temperature that approached the melting point temperature of the high melting point polyolefin, i.e., Comparative Composition 27.

For example, comparing the $2^{nd}$ melt melting temperature of Test Compositions 14 & 16, and Comparative Composition 27 illustrates an increase in melting point of the thermoplastic polymer compositions. Composition 14, having a melting point of 120.3, is composed of 100% low melting point propylene. Composition 16, having a melting point of 161.5, is a blend (85.74%/14.26%) of low melting point propylene and high melting point polyolefin. Composition 27, having a melting point of 165.0 is 100% high melting point polyolefin. Upon blending with the high melting point polyolefin, the melting temperature of composition 16 increased by 41.2° C., or about 34%, compared to composition 14. Even though the melting temperature increased, the composition maintained a single melting point.

Example 3

Compositions 1-21 were prepared by melt blending a low melting point propylene copolymer prepared with metallocene catalyst with varying amounts of a high melting point polyolefin. No elastomeric component was included in Test Compositions 1-21.

Compositions 1-7 included a low melting point propylene copolymer composed of 4.49 weight percent ethylene and isotactic polypropylene segments. Test Compositions 8-14 included a low melting point propylene copolymer composed of 6.82 weight percent ethylene and isotactic polypropylene segments. Test Compositions 15-21 included a low melting point propylene terpolymers composed of 1.03 weight percent ethylene, 4.0 weight percent octene, and isotactic polypropylene segments. As shown in Table 6, the compositions were compounded with varying amounts of the same high melting point polyolefin, an isotactic polypropylene prepared with Ziegler Natta catalyst, which is commercially available as Equistar 51S07A, Sunoco F0008F from Sunoco Chemical Co.

Each test composition was melt blended in a conventional extruder operating at 100 rpm, 180° C., with a nitrogen blanket for three minutes. The components of each composition are shown in Table 6:

TABLE 6

| Test Composition | Low Melting Point Propylene Copolymer Wt % | High Melting Point Polyolefin Wt % | Wt % Comonomer in Low Melting Point Copolymer |
|---|---|---|---|
| 1 | 100 | 0 | 4.49 |
| 2 | 90 | 10 | 4.49 |
| 3 | 80 | 20 | 4.49 |
| 4 | 60 | 40 | 4.49 |
| 5 | 40 | 60 | 4.49 |
| 6 | 20 | 80 | 4.49 |
| 7 | 10 | 90 | 4.49 |
| 8 | 100 | 0 | 6.82 |
| 9 | 90 | 10 | 6.82 |
| 10 | 80 | 20 | 6.82 |
| 11 | 60 | 40 | 6.82 |
| 12 | 40 | 60 | 6.82 |
| 13 | 20 | 80 | 6.82 |
| 14 | 10 | 90 | 6.82 |

| | Terpolymer | $C_2$ | $C_4$ |
|---|---|---|---|
| 15 | 100 | 0 | 1.03 | 4.0 |
| 16 | 90 | 10 | 1.03 | 4.0 |
| 17 | 80 | 20 | 1.03 | 4.0 |
| 18 | 60 | 40 | 1.03 | 4.0 |
| 19 | 40 | 60 | 1.03 | 4.0 |
| 20 | 20 | 80 | 1.03 | 4.0 |
| 21 | 10 | 90 | 1.03 | 4.0 |

As shown below in Tables 7 & 8 and FIG. 2, the melting temperature and related thermographic properties were measured by differential scanning calorimetry:

TABLE 7

| Test Comp. | $T_{m1}$ (° C.) | $\Delta H_{f1}$ (J/g) | $T_{m2}$ (° C.) | $\Delta H_{f2}$ (J/g) | $T_{c1}$ (° C.) | $\Delta H_{c1}$ (J/g) | $T_{c2}$ (° C.) | $\Delta H_{c2}$ (J/g) |
|---|---|---|---|---|---|---|---|---|
| 1st Heat/Cool at 10° C./min | | | | | | | | |
| 1 | 107.5 | 48.4 | — | — | — | — | 71.0 | 48.4 |
| 2 | 110.5 | 38.1 | 158.2 | 10.8 | 91.8 | 53.2 | — | — |
| 3 | 117.7 | 26.1 | 159.9 | 22.0 | 99.7 | 52.8 | — | — |
| 4 | — | — | 162.8 | 55.3 | 105.2 | 60.8 | — | — |

TABLE 7-continued

1st Heat/Cool at 10° C./min

| Test Comp. | $T_{m1}$ (°C.) | $\Delta H_{f1}$ (J/g) | $T_{m2}$ (°C.) | $\Delta H_{f2}$ (J/g) | $T_{c1}$ (°C.) | $\Delta H_{c1}$ (J/g) | $T_{c2}$ (°C.) | $\Delta H_{c2}$ (J/g) |
|---|---|---|---|---|---|---|---|---|
| 5 | — | — | 164.3 | 66.1 | 112.6 | 72.1 | — | — |
| 6 | — | — | 165.4 | 79.7 | 113.5 | 83.4 | — | — |
| 7 | — | — | 166.4 | 83.9 | 113.9 | 88.3 | — | — |
| 8 | 97.9 | 55.4 | — | — | — | — | 59.4 | 42.4 |
| 9 | 99.7 | 19.6 | 159.0 | 10.0 | 95.5 | 21.8 | 75.0 | 19.6 |
| 10 | 97.1 | 16.0 | 160.4 | 25.5 | 103.6 | 32.8 | 73.6 | 12.3 |
| 11 | — | — | 162.7 | 48.9 | 108.7 | 51.3 | — | — |
| 12 | — | — | 164.6 | 65.0 | 112.7 | 67.0 | — | — |
| 13 | — | — | 165.8 | 80.6 | 113.7 | 83.8 | — | — |
| 14 | — | — | 166.7 | 87.3 | 113.4 | 88.0 | — | — |
| 15 | 111.1 | 50.9 | — | — | 69.8 | 50.1 | — | — |
| 16 | 112.6 | 38.3 | 158.0 | 11.1 | 84.7 | 49.6 | — | — |
| 17 | 118.2 | 32.3 | 159.8 | 19.6 | 92.7 | 50.8 | — | — |
| 18 | — | — | 161.3 | 61.0 | 102.9 | 61.4 | — | — |
| 19 | — | — | 163.8 | 71.5 | 107.2 | 72.6 | — | — |
| 20 | — | — | 164.9 | 81.6 | 113.2 | 81.7 | — | — |
| 21 | — | — | 166.3 | 84.3 | 112.5 | 88.5 | — | — |

TABLE 8

2nd Heat/Cool at 10° C./min

| Test Comp. | $T_{m1}$ (°C.) | $\Delta H_{f1}$ (J/g) | $T_{m2}$ (°C.) | $\Delta H_{f2}$ (J/g) | $T_{c1}$ (°C.) | $\Delta H_{c1}$ (J/g) | $T_{c2}$ (°C.) | $\Delta H_{c2}$ (J/g) |
|---|---|---|---|---|---|---|---|---|
| 1 | 110.1 | 50.7 | — | — | — | — | 71.1 | 50.5 |
| 2 | 103.0 | 46.2 | 159.5 | 14.2 | 91.8 | 55.7 | — | — |
| 3 | 104.7 | 33.2 | 161.1 | 28.9 | 99.5 | 62.6 | — | — |
| 4 | — | — | 163.8 | 66.9 | 104.9 | 67.0 | — | — |
| 5 | — | — | 163.8 | 71.3 | 112.6 | 70.4 | — | — |
| 6 | — | — | 163.6 | 84.3 | 113.6 | 85.4 | — | — |
| 7 | — | — | 165.1 | 91.1 | 113.7 | 90.4 | — | — |
| 8 | 100.2 | 44.0 | — | — | — | — | 59.6 | 41.4 |
| 9 | 93.6 | 34.1 | 160.4 | 15.8 | 95.6 | 22.8 | 75.4 | 23.1 |
| 10 | 90.1 | 27.5 | 162.4 | 26.0 | 103.8 | 33.7 | 73.4 | 19.4 |
| 11 | — | — | 163.3 | 52.0 | 108.6 | 52.7 | — | — |
| 12 | — | — | 164.2 | 67.9 | 112.8 | 66.7 | — | — |
| 13 | — | — | 164.3 | 87.4 | 113.8 | 85.4 | — | — |
| 14 | — | — | 165.5 | 93.1 | 113.4 | 88.9 | — | — |
| 15 | 111.2 | 49.7 | — | — | 69.7 | 48.7 | — | — |
| 16 | 109.5 | 47.7 | 158.1 | 11.7 | 84.8 | 57.7 | — | — |
| 17 | 105.7 | 40.4 | 160.3 | 21.3 | 93.0 | 56.9 | — | — |
| 18 | — | — | 161.9 | 67.9 | 102.8 | 66.6 | — | — |
| 19 | — | — | 164.0 | 75.6 | 107.2 | 74.5 | — | — |
| 20 | — | — | 163.2 | 85.2 | 112.7 | 84.3 | — | — |
| 21 | — | — | 163.8 | 90.3 | 112.4 | 89.0 | — | — |

As shown in Tables 7 & 8 and FIG. 2, copolymer blends having as much as 6.82 weight percent comonomer, and even higher order polymers such as terpolymers, exhibited a single melting point temperature and crystallization temperature over a broad range of compositions. Similar to Example 2, the compositions exhibited a melting point temperature that approached the melting point temperature of the high melting point polyolefin while maintaining a single melting point.

As shown below in Table 9, the physical properties of compositions 1-21 were examined:

TABLE 9

Physical Properties

| Test Comp. | Specific Gravity | Hardness, Shore A | UTS (psi) | UTS (MPa) | Elongation when necking started (%) | Elongation at break, (%) | 100% Mod. (psi) | 100% Mod. (MPa) |
|---|---|---|---|---|---|---|---|---|
| 1 | — | — | — | — | — | — | — | — |
| 2 | 0.893 | 94 | 4200 | 28.97 | 7 | 809 | 1788 | 12.33 |
| 3 | 0.896 | 95 | 4675 | 32.24 | 7 | 811 | 2235 | 15.41 |
| 4 | 0.899 | 95 | 4812 | 33.19 | 8 | 800 | 2529 | 17.44 |
| 5 | 0.903 | 91 | 3963 | 27.33 | 11 | 767 | 2629 | 18.13 |
| 6 | 0.907 | 97 | 4703 | 32.43 | 8 | 696 | 3116 | 21.49 |
| 7 | 0.909 | 95 | 4963 | 34.23 | 8 | 720 | 3270 | 22.55 |
| 8 | — | — | — | — | — | — | — | — |
| 9 | 0.889 | 93 | 3841 | 26.49 | 7 | 825 | 1532 | 10.57 |
| 10 | 0.892 | 92 | 3908 | 26.95 | 6 | 816 | 1709 | 11.79 |
| 11 | 0.897 | 93 | 4656 | 32.11 | 8 | 816 | 2282 | 15.74 |
| 12 | 0.902 | 92 | 4503 | 31.06 | 8 | 719 | 2677 | 18.46 |
| 13 | 0.905 | 93 | 4324 | 29.82 | 9 | 675 | 2925 | 20.17 |
| 14 | 0.907 | 91 | 4686 | 32.32 | 11 | 613 | 3099 | 21.37 |
| 15 | 0.890 | 93 | 4576 | 31.56 | 8 | 713 | 1827 | 12.60 |
| 16 | 0.892 | 91 | 4837 | 33.36 | 8 | 724 | 2071 | 14.28 |
| 17 | 0.895 | 91 | 4685 | 32.31 | 7 | 696 | 2225 | 15.34 |
| 18 | 0.899 | 90 | 5452 | 37.60 | 7 | 780 | 2609 | 17.99 |
| 19 | 0.902 | 91 | 4795 | 33.07 | 9 | 677 | 2836 | 19.56 |
| 20 | 0.906 | 92 | 5355 | 36.93 | 8 | 714 | 3049 | 21.03 |
| 21 | 0.908 | 98 | 4703 | 32.43 | 9 | 720 | 3124 | 21.54 |

As shown in Table 9, the compositions exhibited favorable physical properties, such as for example strength and elasticity.

Example 4

Thirty compositions, 1-30, were prepared by melt blending a low melting point propylene copolymer prepared with Ziegler Natta catalyst and varying amounts of a high melting point polyolefin. No elastomeric component was included in these compositions.

Compositions 1-10 included a low melting point polypropylene copolymer composed of 2.15 weight percent ethylene and isotactic polypropylene segments. Test Compositions 11-20 included a low melting point polypropylene copolymer composed of 4.0 weight percent ethylene and isotactic polypropylene segments. Test Compositions 21-30 included a low melting point polypropylene terpolymer composed of 3.6 weight percent ethylene, 6.0 weight percent butylene, and isotactic polypropylene segments. The terpolymer is commercially available as Adsyl 5C30F from Basell of Pasadena, Tex. As shown in Table 10, the compositions were compounded with varying amounts of the same high melting point polyolefin, an isotactic polypropylene prepared with Ziegler Natta catalyst, which is commercially available as Equistar 51S07A, Sunoco F008F from Sunoco Chemical Co.

Each test composition was melt blended in a conventional Brabender mixer operating at 100 rpm, 160° C., with a nitrogen blanket for three minutes. The components of each composition are shown in Table 10:

TABLE 10

| Composition | Low Melting Point Propylene Copolymer | High Melting Point Polyolefin | Wt % Comonomer in Low Melting Point Propylene Copolymer |
|---|---|---|---|
| 1 | 100 | 0 | 2.15 |
| 2 | 90 | 10 | 2.15 |
| 3 | 80 | 20 | 2.15 |
| 4 | 70 | 30 | 2.15 |
| 5 | 60 | 40 | 2.15 |
| 6 | 50 | 50 | 2.15 |
| 7 | 40 | 60 | 2.15 |
| 8 | 30 | 70 | 2.15 |
| 9 | 20 | 80 | 2.15 |
| 10 | 10 | 90 | 2.15 |
| 11 | 100 | 0 | 4.0 |
| 12 | 90 | 10 | 4.0 |
| 13 | 80 | 20 | 4.0 |
| 14 | 70 | 30 | 4.0 |
| 15 | 60 | 40 | 4.0 |
| 16 | 50 | 50 | 4.0 |
| 17 | 40 | 60 | 4.0 |
| 18 | 30 | 70 | 4.0 |
| 19 | 20 | 80 | 4.0 |
| 20 | 10 | 90 | 4.0 |

| | Terpolymer | | $C_2$ | $C_4$ |
|---|---|---|---|---|
| 21 | 100 | | 0 | 3.6 | 6.0 |
| 22 | 90 | | 10 | 3.6 | 6.0 |
| 23 | 80 | | 20 | 3.6 | 6.0 |
| 24 | 70 | | 30 | 3.6 | 6.0 |
| 25 | 60 | | 40 | 3.6 | 6.0 |
| 26 | 50 | | 50 | 3.6 | 6.0 |
| 27 | 40 | | 60 | 3.6 | 6.0 |
| 28 | 30 | | 70 | 3.6 | 6.0 |
| 29 | 20 | | 80 | 3.6 | 6.0 |
| 30 | 10 | | 90 | 3.6 | 6.0 |
| Comparative: 100 wt % High Melting Point Polyolefin | | | | |
| 31 | 0 | | 100 | 0 |

As shown below in Table 11 and FIG. 3, the melting temperature and related thermographic properties of compositions 1-30 were measured by differential scanning calorimetry:

TABLE 11

| | 1st Heat/Cool at 10° C./min | | | | 2nd Heat/Cool at 10° C./min | | | |
|---|---|---|---|---|---|---|---|---|
| Comp. | Tm (° C.) | ΔHf (J/g) | Tc (° C.) | ΔHc (J/g) | Tm (° C.) | ΔHf (J/g) | Tc (° C.) | ΔHc (J/g) |
| 1 | 149.1 | 80.8 | 103.8 | 83.9 | 148.5 | 84.4 | 103.9 | 84.2 |
| 2 | 152.5 | 81.7 | 106.0 | 85.6 | 151.5 | 92.4 | 106.1 | 85.7 |
| 3 | 154.3 | 88.9 | 106.5 | 88.6 | 153.1 | 93.9 | 106.7 | 89.9 |
| 4 | 156.4 | 88.4 | 105.8 | 87.5 | 155.3 | 93.5 | 105.7 | 87.9 |
| 5 | 158.7 | 89.2 | 108.0 | 89.9 | 157.1 | 94.6 | 108.0 | 89.6 |
| 6 | 161.4 | 85.9 | 108.7 | 93.4 | 160.1 | 95.1 | 108.5 | 90.8 |
| 7 | 162.3 | 87.0 | 109.6 | 94.5 | 159.8 | 97.2 | 109.3 | 94.0 |
| 8 | 162.2 | 97.5 | 110.9 | 95.4 | 160.5 | 96.7 | 110.6 | 95.1 |
| 9 | 162.8 | 100.8 | 111.4 | 96.9 | 162.8 | 98.1 | 111.0 | 97.2 |
| 10 | 164.0 | 98.2 | 111.7 | 97.0 | 163.8 | 101.9 | 111.3 | 96.5 |
| 11 | 139.8 | 66.6 | 95.6 | 68.3 | 139.8 | 69.5 | 96.0 | 68.9 |
| 12 | 144.2 | 72.8 | 101.6 | 71.0 | 144.6 | 72.3 | 101.8 | 69.6 |
| 13 | 149.7 | 76.6 | 101.2 | 75.4 | 149.4 | 77.0 | 101.1 | 77.3 |
| 14 | 158.2 | 76.0 | 104.5 | 78.6 | 159.3 | 77.4 | 104.5 | 77.8 |
| 15 | 160.8 | 80.6 | 105.0 | 81.7 | 161.2 | 81.8 | 104.6 | 80.4 |
| 16 | 161.5 | 85.8 | 107.3 | 85.2 | 161.2 | 84.6 | 107.3 | 84.3 |
| 17 | 163.0 | 88.6 | 107.1 | 87.4 | 162.0 | 88.3 | 106.8 | 87.6 |
| 18 | 163.0 | 94.1 | 108.3 | 94.0 | 161.6 | 93.9 | 108.0 | 93.1 |
| 19 | 164.3 | 92.3 | 108.8 | 92.9 | 164.3 | 93.4 | 108.6 | 91.4 |
| 20 | 162.9 | 97.3 | 111.3 | 95.6 | 162.6 | 96.3 | 110.9 | 95.1 |
| 21 | 136.1 | 59.4 | 90.5 | 59.8 | 132.9 | 61.2 | 90.6 | 59.7 |
| 22 | 155.8 | 52.6 | 97.1 | 62.2 | 156.4 | 66.9 | 96.7 | 70.9 |
| 23 | 159.4 | 62.6 | 100.5 | 70.6 | 159.0 | 66.5 | 100.1 | 66.0 |
| 24 | 160.3 | 67.8 | 105.9 | 70.4 | 160.7 | 68.4 | 105.2 | 67.1 |
| 25 | 161.7 | 67.1 | 104.8 | 70.5 | 161.2 | 73.7 | 104.1 | 72.2 |
| 26 | 162.0 | 70.0 | 106.6 | 75.9 | 162.6 | 77.8 | 106.1 | 77.1 |
| 27 | 163.6 | 76.0 | 110.4 | 83.0 | 161.9 | 81.9 | 110.0 | 81.5 |
| 28 | 164.1 | 86.1 | 108.7 | 85.7 | 163.9 | 85.9 | 108.5 | 85.7 |
| 29 | 164.3 | 87.2 | 109.9 | 89.5 | 162.9 | 90.2 | 109.6 | 88.9 |
| 30 | 162.6 | 96.0 | 110.8 | 95.2 | 162.3 | 100.8 | 110.6 | 100.2 |
| Comparative: 100 wt % High Melting Point Polyolefin | | | | | | | | |
| 31 | 165.2 | 95.2 | 114.7 | 103.6 | 163.8 | 100.4 | 114.3 | 100.5 |

Figure 3:
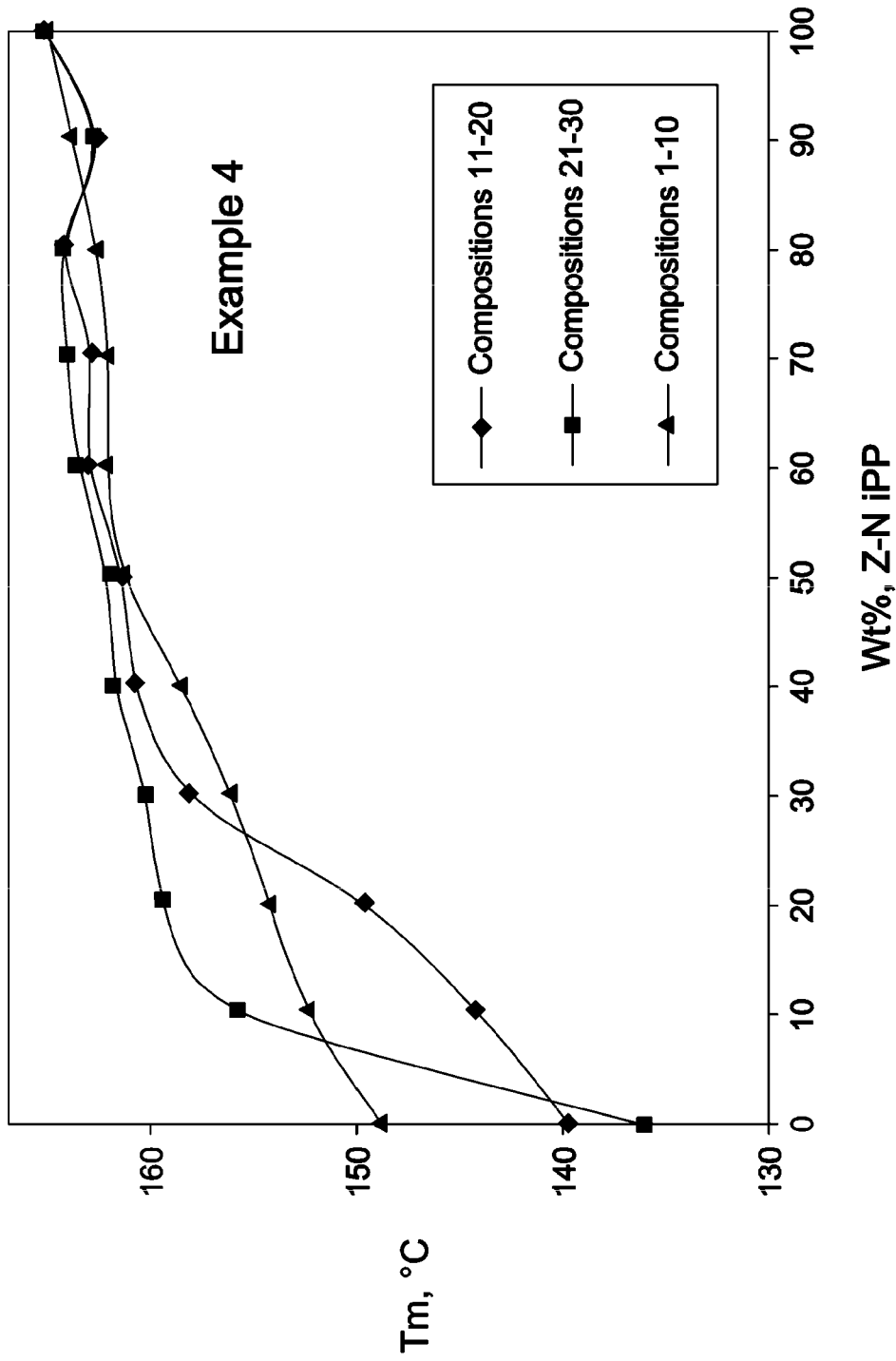
FIG. 3 is another X-Y graph of melting temperature versus weight percent high melting point polyolefin that illustrates the melting temperatures of exemplary thermoplastic polymer compositions.

As shown in Table 11 and FIG. 3, the compositions exhibited a melting point temperature that approached the melting point temperature of the high melting point polyolefin. Comparing Example 3 & 4, compositions prepared with Metallocene catalyst, and compositions prepared with Ziegler-Natta catalyst, both exhibited a single melting point.

Melting point depression of thermoplastic polymer composition results from modifying the polymer system, i.e., homopolymer, copolymer, comonomer content, and the catalyst system, single site, Ziegler Natta, or combinations thereof. For example, crystal defects are created by (1) synthesizing a thermoplastic polymer composition with a metallocene catalyst, or (2) synthesizing a thermoplastic polymer composition composed of a propylene copolymer with Ziegler Natta catalyst. Further, the quantity of comonomer in propylene copolymers may also be varied to further control the amount of crystal defects in a polymer lattice.

Comparing Examples 3 & 4 illustrates how similar thermographic results are achieved by different means of creating crystal defects in a polymer lattice. Referring to the compositions, thermoplastic polymer compositions prepared with Ziegler Natta catalyst and composed of low melting point propylene having about 4 weight percent ethylene comonomer exhibited about the same melting temperature as isotactic polypropylene prepared with metallocene catalyst.

Example 5

Thermoplastic polymer compositions were prepared in-situ by multi-stage solution phase polymerization utilizing two reactors. The thermoplastic component was a low melting point polypropylene copolymer containing ethylene comonomers. The elastomeric component was prepared in the second reactor.

Utilizing low melting point polypropylene enabled the use of lower solution temperatures for polymerization. As a result, the thermoplastic component exhibited higher molecular weight than would have been achieved by higher solution temperatures.

After polymerization, the thermoplastic and elastomeric components were compounded with 30 parts by weight per hundred parts rubber of a high melting point polypropylene, hydrosilation curatives, and 90 parts of mineral oil. The high melting point polyolefin was an isotactic polypropylene prepared with Ziegler-Natta catalyst having a melting point of 165.2° C. The high melting point polyolefin is commercially available as Equistar 51S07A, Sunoco F008F from Sunoco Corporation. The hydrosylation curative was composed of 3 parts silicon hydride available from Dow Corning as DC2-5084 and 8 parts of a 2.2 weight percent active platinum catalyst available from United Chemical Technology, Inc as PC085. The thermoplastic polymer composition was cured to form a thermoplastic vulcanizate.

As shown below in Table 12, the melting point and related properties of the blended thermoplastic and elastomeric components where measured before and after being compounded with high melting point polyolefin.

TABLE 12

|  | In-Reactor | Compounded & Cured |
|---|---|---|
| $1^{st}$ Heat & Cool at 0° C./min | | |
| $T_m$ (° C.) | 134.5 | 152.1 |
| $\Delta H_f$ (J/g) | 29.8 | 26.8 |
| $T_{c1}$ (° C.) | 95.8 | 102.9 |
| $\Delta H_{c1}$ (J/g) | 30.2 | 27.0 |
| $T_{c2}$ (° C.) | — | — |
| $\Delta H_{c2}$ (J/g) | — | — |
| $2^{nd}$ Heat & Cool at 10° C./min | | |
| Infl. $T_g$ (° C.) | 56.6 | −64.4 |
| $T_m$ (° C.) | 135.9 | 152.0 |
| $\Delta H_f$ (J/g) | 21.7 | 29.6 |
| $T_{c1}$ (° C.) | 94.8 | 102.7 |
| $\Delta H_{c1}$ (J/g) | 20.5 | 27.6 |
| $T_{c2}$ (° C.) | — | — |
| $\Delta H_{c2}$ (J/g) | — | — |

Figure 4:
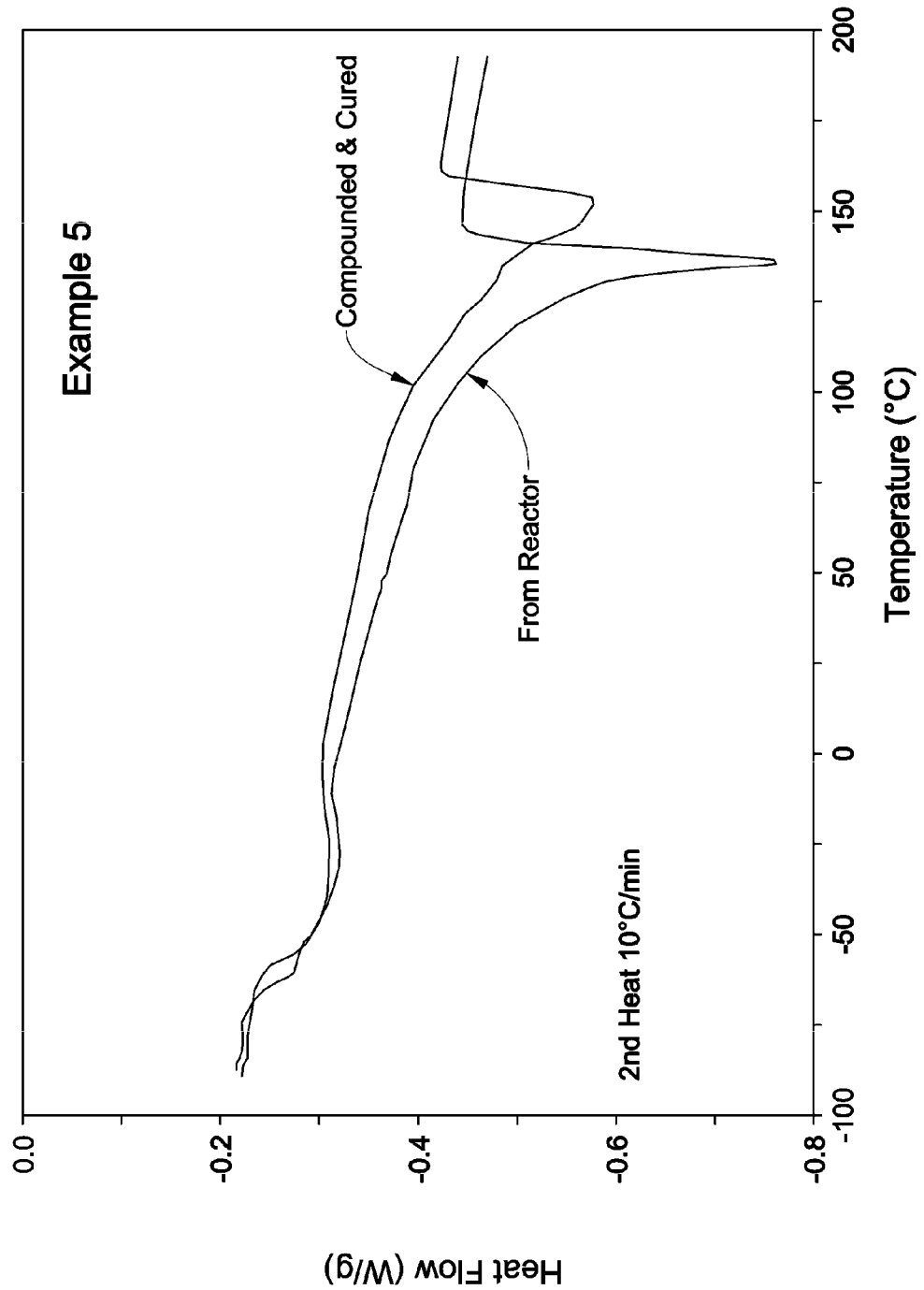
FIG. 4 is an X-Y graph of heat flow versus temperature that illustrates the melting temperatures of an exemplary thermoplastic polymer composition both before and after compounding with a high melting point polyolefin.

As shown in Table 12 and in FIG. 4, the thermoplastic polymer composition exhibited a melting point temperature that approached the melting point temperature of the high melting point polyolefin. The melting point of the thermoplastic polymer composition before compounding was 134.5° C. After compounding and curing, the melting point was elevated to 152.1° C., an increase of about 17.6° C., i.e., about 13%.

Example 6

Thermoplastic polymer compositions, Test Compositions 1-6, were prepared in-situ by multi-stage solution phase polymerization utilizing two reactors as described in Example 5. The thermoplastic phase was composed of a low melting point polypropylene copolymer containing ethylene comonomers. The elastomeric component was prepared in the second reactor.

Figure 5:
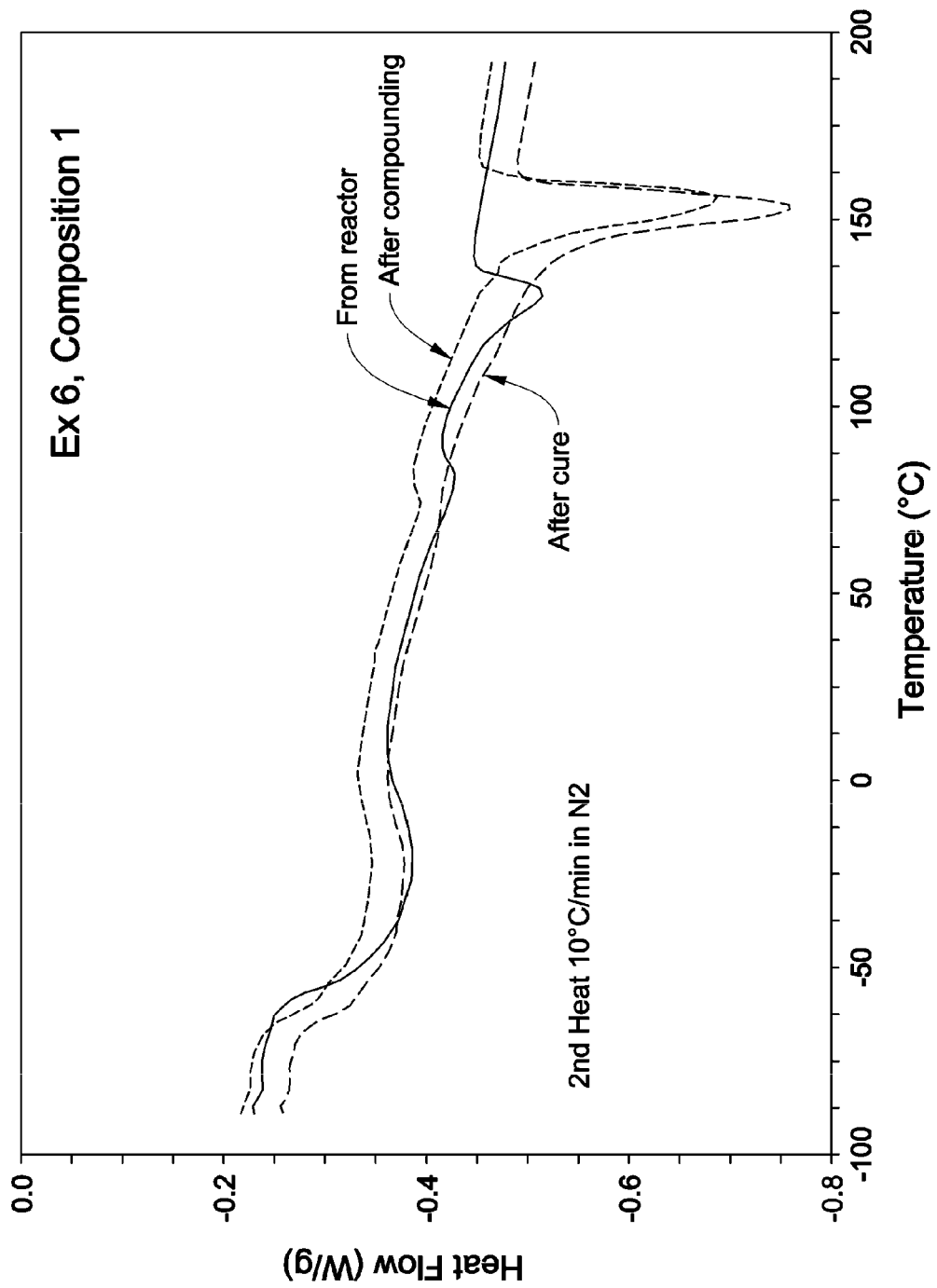
FIG. 5 is another X-Y graph of heat flow versus temperature that illustrates the melting temperatures of exemplary thermoplastic polymer compositions.

As shown below in Table 13 and FIG. 5, the melting point and related thermographic properties of each Test Composition were measured by differential scanning calorimetry before compounding, after compounding, and after being cured.

TABLE 13

| Test Comp. | $T_{m1}$ (° C.) | $\Delta H_{f1}$ (J/g) | $T_{m2}$ (° C.) | $\Delta H_{f2}$ (J/g) | $T_{c1}$ (° C.) | $\Delta H_{c1}$ (J/g) | $T_{c2}$ (° C.) | $\Delta H_{c2}$ (J/g) |
|---|---|---|---|---|---|---|---|---|
| Before Compounding ||||||||| 
| 1 | 79 | 3 | 130 | 7 | — | — | 51 | 7 |
| 2 | 78 | 3 | 130 | 8 | — | — | 52 | 8 |
| 3 | 79 | 8 | 131 | 8 | — | — | 53 | 14 |
| 4 | 78 | 3 | 131 | 78 | 90 | 16 | 51 | 4 |
| 5 | 77 | 6 | 131 | 19 | 91 | 16 | 51 | 6 |
| 6 | 77 | 6 | 131 | 19 | 91 | 17 | 52 | 7 |
| After Compounding ||||||||| 
| 1 | — | — | 156 | 26 | 103 | 24 | — | — |
| 2 | — | — | 154 | 26 | 104 | 25 | — | — |
| 3 | 71 | 4 | 154 | 27 | 105 | 25 | 42 | 4 |
| 4 | — | — | 155 | 27 | 101 | 26 | — | — |
| 5 | — | — | 155 | 28 | 99 | 26 | — | — |
| 6 | — | — | 154 | 27 | 100 | 26 | — | — |
| After Being Cured ||||||||| 
| 1 | — | — | 153 | 26 | 107 | 25 | — | — |
| 2 | — | — | 153 | 25 | 107 | 23 | — | — |
| 3 | 66 | 3 | 153 | 24 | 107 | 24 | — | — |
| 4 | — | — | 150 | 25 | 109 | 24 | — | — |
| 5 | — | — | 151 | 26 | 107 | 24 | — | — |
| 6 | — | — | 151 | 26 | 106 | 24 | — | — |

As shown in Tables 14A-C, physical properties of each Test Composition were observed before compounding, after compounding, and after being cured.

TABLE 14A

| | Before Compounding | | | | | |
|---|---|---|---|---|---|---|
| Test Comp. | 1 | 2 | 3 | 4 | 5 | 6 |
| Specific Gravity | 0.862 | 0.861 | 0.865 | 0.870 | 0.872 | 0.872 |
| Hardness ASTM Shore (A) | 49 | 48 | 48 | 74 | 77 | 77 |
| UTS (MPa) | 2.12 | 2.01 | 1.49 | 4.66 | 4.94 | 5.04 |
| Elongation at break, (%) | 383 | 344 | 941 | 301 | 292 | 323 |
| 100% Mod. (MPa) | 1.48 | 1.43 | 1.10 | 3.56 | 3.92 | 3.97 |
| Tension Set (%) | 13 | 15 | 16 | 22 | 26 | 25 |
| LCR Capillary Viscosity, Pa s @204 C. | Over load | Over load | 336 | 337 | 313 | 313 |
| Oil Swell (%), in IRM903, 24 h@121 C. | Dissolved | Dissolved | Dissolved | Dissolved | Dissolved | Dissolved |
| Comp. Set (%), 22 h @ 70 C. | 67 | 71 | 86 | 61 | 65 | 47 |

TABLE 14B

| After Compounding | | | | | | |
|---|---|---|---|---|---|---|
| Test Comp. | 1 | 2 | 3 | 4 | 5 | 6 |
| Specific Gravity | 0.875 | 0.875 | 0.877 | 0.877 | 0.877 | 0.877 |
| Hardness ASTM Shore (A) | 64 | 65 | 62 | 69 | 71 | 72 |
| UTS (MPa) | 3.30 | 2.57 | 3.04 | 2.75 | 3.24 | 3.42 |
| Elongation at break, (%) | 314 | 237 | 228 | 199 | 210 | 271 |
| 100% Mod. (MPa) | 2.71 | 2.21 | 2.71 | 2.45 | 2.86 | 2.83 |
| Tension Set (%) | 45 | 43 | 48 | 38 | 40 | 39 |
| LCR Capillary Viscosity, Pa s @204 C. | 83 | 81 | 77 | 50 | 58 | 59 |
| Comp. Set (%), 22 h @ 70 C. | 83 | 79 | 79 | 78 | 77 | 77 |

TABLE 14C

| After Being Cured | | | | | | |
|---|---|---|---|---|---|---|
| Test Comp. | 1 | 2 | 3 | 4 | 5 | 6 |
| Specific Gravity | 0.882 | 0.883 | 0.886 | 0.885 | 0.885 | 0.886 |
| Hardness ASTM Shore (A) | 72 | 72 | 73 | 71 | 75 | 75 |
| UTS (MPa) | 5.39 | 6.19 | 5.91 | 6.17 | 6.84 | 6.86 |
| Elongation at break, (%) | 319 | 346 | 428 | 409 | 442 | 434 |
| 100% Mod. (MPa) | 3.11 | 3.23 | 3.03 | 3.23 | 3.46 | 3.60 |
| Tension Set (%) | 17 | 16 | 18 | 20 | 19 | 20 |
| LCR Capillary Viscosity, Pa s @204 C. | 104 | 98 | 89 | 67 | 74 | 68 |
| Oil Swell (%), in IRM903, 24 h@121 C. | 208 | 197 | 226 | 228 | 223 | 213 |
| Comp. Set (%), 22 h @ 70 C. | 45 | 45 | 52 | 53 | 50 | 51 |

As shown in Table 14A-C, each test composition exhibited favorable elastic properties. It should be noted that lower tension set values represent materials having greater elasticity.

What is claimed is:

1. A thermoplastic polymer composition comprising:
   at least 40 weight percent, based on the weight of the thermoplastic polymer composition, of a thermoplastic component comprising low melting point copolymer having a melting temperature of greater than or equal to 107.5° C. and not more than about 150° C. composed of stereoregular polypropylene segments and from about 0.1 to about 5.0 weight percent of ethylene-derived units, based on the weight of the low melting point copolymer, and
   at least 20 weight percent, based on the weight of the thermoplastic polymer composition, of a high melting point polyolefin having a melting point of greater than 150° C. and greater than the melting point of the low melting point copolymer,
   wherein the thermoplastic polymer composition has a single melting point of at least 161.9° C.; and
   wherein the melting point of the thermoplastic polymer composition is within at least about 15% of the melting point of the high melting point polyolefin according to the follow formula:

$$100 * \frac{\left[\begin{array}{l} Tm[C]\text{high melting point } polyolefin - \\ Tm[C]\text{thermoplastic polymer composition} \end{array}\right]}{Tm[C]\text{high melting point } polyolefin} \leq 15\%.$$

2. The thermoplastic polymer composition of claim 1, wherein the low melting point copolymer is prepared with a single site catalyst, Ziegler Natta catalyst, or combinations thereof.

3. The thermoplastic polymer composition of claim 1, wherein the high melting point polyolefin is prepared with a single site catalyst, Ziegler Natta catalyst, or combinations thereof.

4. The thermoplastic polymer composition of claim 1, wherein the low melting point copolymer is prepared with at least one catalyst selected from the group consisting of vanadium catalysts, Group IV-VI metallocenes, and Brookhart catalysts.

5. The thermoplastic polymer composition of claim 1, wherein the high melting point polyolefin is prepared with at least one catalyst selected from the group consisting of vanadium catalysts, Group IV-VI metallocenes, and Brookhart catalysts.

6. The thermoplastic polymer composition of claim 1, wherein the high melting point polyolefin is a substantially stereoregular polypropylene having substantially the same tacticity as the stereoregular polypropylene segments of the copolymer.

7. The thermoplastic polymer composition of claim 1, wherein the thermoplastic polymer composition is composed of from about 20 to about 60 weight percent of high melting point polyolefin.

8. The thermoplastic polymer composition of claim 1, further comprising an elastomeric component.

9. The thermoplastic polymer composition of claim 1, wherein the thermoplastic polymer composition is a thermoplastic vulcanizate.

10. The thermoplastic polymer composition of claim 1, wherein the single melting point of the thermoplastic polymer composition is greater than about 165° C.

11. An article comprising the thermoplastic polymer composition of claim 1.

12. A method of elevating the melting point of a thermoplastic polymer composition comprising the steps of:
 (a) providing at least 40 weight percent, based on the weight of the thermoplastic polymer composition, of a thermoplastic component comprising a low melting point copolymer having a melting temperature of greater than or equal to 107.5° C. and not more than about 150° C. composed of stereoregular polypropylene segments and from about 0.1 to about 7.0 weight percent, based on the weight of the copolymer, of comonomer, and
 (b) combining the thermoplastic component with at least 20 weight percent, based on the weight of the thermoplastic polymer composition, of a high melting point polyolefin having a melting point of greater than 150° C. and greater than the melting point of the low melting point copolymer,
 wherein the thermoplastic polymer composition has a single melting point of at least 161.9° C.; and
 wherein the melting point of the thermoplastic polymer composition is within at least about 15% of the melting point of the high melting point polyolefin according to the follow formula:

$$100 * \frac{\left[ \begin{array}{l} Tm[C]\text{high melting point } polyolefin - \\ Tm[C]\text{thermoplastic polymer composition} \end{array} \right]}{Tm[C]\text{high melting point } polyolefin} \leq 15\%.$$

13. The method of elevating the melting point of a thermoplastic polymer composition of claim 12, further comprising the steps of:
 providing an elastomeric component, and
 combining the thermoplastic component and the elastomeric component either before or after adding the high melting point polyolefin.

14. The method of elevating the melting point of a thermoplastic polymer composition of claim 13, further comprising the step of curing the elastomeric component.

15. The method of elevating the melting point of a thermoplastic polymer composition of claim 12, wherein the single melting point of the thermoplastic polymer composition is greater than about 165° C.

* * * * *